(12) United States Patent  
Palchoudhury

(10) Patent No.: US 12,441,666 B2  
(45) Date of Patent: Oct. 14, 2025

(54) SEED PRE-SOAK TECHNOLOGY WITH A DROP OF HEMATITE NANOPARTICLE FERTILIZER FOR INCREASED PLANT GROWTH

(71) Applicant: University of Tennessee Research Foundation, Knoxville, TN (US)

(72) Inventor: Soubantika Palchoudhury, Chattanooga, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 478 days.

(21) Appl. No.: 17/205,304

(22) Filed: Mar. 18, 2021

(65) Prior Publication Data

US 2021/0292253 A1 Sep. 23, 2021

Related U.S. Application Data

(60) Provisional application No. 62/992,357, filed on Mar. 20, 2020.

(51) Int. Cl.
| | | |
|---|---|---|
| *C05D 9/02* | (2006.01) |
| *C05G 5/23* | (2020.01) |
| *C05G 5/27* | (2020.01) |
| *C05G 5/30* | (2020.01) |

(52) U.S. Cl.
CPC .............. *C05D 9/02* (2013.01); *C05G 5/23* (2020.02); *C05G 5/27* (2020.02); *C05G 5/37* (2020.02)

(58) Field of Classification Search
CPC ... C05D 9/02; C05G 5/23; C05G 5/27; C05G 5/37; C05G 5/10
See application file for complete search history.

(56) References Cited

U.S. PATENT DOCUMENTS

| | | |
|---|---|---|
| 2013/0219979 A1 | 8/2013 | Deb |
| 2015/0027050 A1 | 1/2015 | Cave et al. |
| 2016/0229763 A1 | 8/2016 | Wheeler et al. |
| 2017/0240482 A1 | 8/2017 | Kaiser, II |
| 2019/0047917 A1 | 2/2019 | Huang et al. |

FOREIGN PATENT DOCUMENTS

| | | | |
|---|---|---|---|
| RU | 2463757 | * | 10/2012 |
| RU | 2463757 C1 | * | 10/2012 |
| RU | 2582499 | * | 4/2016 |
| RU | 2582499 C1 | * | 4/2016 |

OTHER PUBLICATIONS

Maswada et al (Seed treatment with nano-iron (III) oxide enhances germination, seeding growth and salinity tolerance of sorghum)., Wiley. J Agro Crop Sci: 2018:204:577-587. (Year: 2018).*

Achari et al., "Recent developments on nanotechnology in agriculture: plant mineral nutrition, health, and interactions with soil microflora," Journal of Agricultural and Food Chemistry, vol. 66, pp. 8647, (2018).
Avellan et al., "Nanoparticle uptake in plants: gold nanomaterial localized in roots of arabidopsis thaliana by X-ray computed nanotomography and hyperspectral imaging," Environmental Science & Technology, vol. 51, pp. 8682, (2017).
Boutchuen et al., "Increased plant growth with hematite nanoparticle fertilizer drop and determining nanoparticle uptake in plants using multimodal approach," Journal of Nanomaterials, vol. 2019, Article ID 6890572, (2019). DOI: 10.1155/2019/6890572.
Das et al., "Nano pyrite seed dressing: A sustainable design for NPK-equivalent rice production," Nanotechnology for Environmental Engineering, vol. 3, pp. 14, (2018).
Ertani et al., "Spectroscopic-chemical fingerprint and biostimulant activity of a protein-based product in solid form," Molecules, vol. 23, pp. 1031, (2018).
Frost et al., "Fertilizer source affects iron, manganese, and zinc leaching, nutrient distribution, and geranium growth," Journal of Plant Nutrition, Jun. 2011.
Ghafariyan et al., "Effects of magnetite nanoparticles on soybean chlorophyll," Environmental Science & Technology, vol. 47, pp. 10645, (2013).
Grillet et al. "Iron in seeds—loading pathways and subcellular localization," Frontiers in Plant Science, vol. 4, pp. 535, (2014).
Gui et al., "Response difference of transgenic and conventional rice (*Oryza sativa*) to nanoparticles (gamma Fe2O3)," Environmental Science and Pollution Research, vol. 22, pp. 17716, (2015).
Iqbal et al., "Appraisal of gene action for indeterminate growth in mungbean *Vigna radiata* (L.) *wilczek*," Frontiers in Plant Science, vol. 6, pp. 665, (2015).
Jeyasubramanian et al., "Enhancement in growth rate and productivity of spinach grown in hydroponics with iron oxide nanoparticles," RSC Advances, vol. 6, pp. 15451, (2016).
Karny et al., "Therapeutic nanoparticles penetrate leaves and deliver nutrients to agricultural crops," Scientific Reports, vol. 8, pp. 7589, (2018).
Kim et al., "Recent developments in nanotechnology transforming the agricultural sector: a transition replete with opportunities," Journal of the Science of Food and Agriculture, vol. 98, pp. 849, (2017).

(Continued)

*Primary Examiner* — Mina Haghighatian
(74) *Attorney, Agent, or Firm* — Jenkins, Taylor & Hunt, P.A.

(57) ABSTRACT

A method for enhancing plant growth by pre-soaking a seed or plant material to be germinated with a drop of an iron oxide nanoparticle solution or dispersion is described. Pre-soaking the seed or other plant material with the nanoparticle solution or dispersion can, among other things, increase the growth rate, life span, fruit production of the plants grown from the pre-soaked seed or other material. Also described are the iron oxide nanoparticles themselves, and methods of preparing the iron oxide nanoparticles. The size, morphology, and surface charge of the iron oxide nanoparticles can be influenced by polymeric organic ligands used in the preparation of the nanoparticles.

19 Claims, 23 Drawing Sheets

(23 of 23 Drawing Sheet(s) Filed in Color)

(56) References Cited

OTHER PUBLICATIONS

Kottegoda et al., "Urea-hydroxyapatite nanohybrids for slow release of nitrogen," ACS Nano, vol. 11, pp. 1214, (2017).
Li et al., "Stimulation of peanut seedling development and growth by zero-valent iron nanoparticles at low concentrations," Plos One, vol. 10, pp. e0122884, (2015).
Lv et al., "Uptake, translocation, and transformation of metal-based nanoparticles in plants: recent advances and methodological challenges," Environmental Science: Nano, vol. 6, pp. 41, (2019).
Miles et al., "Performance of northwest washington heirloom dry bean varieties in organic production," Agronomy-Basel, vol. 5, pp. 491, (2015).
Milewska-Hendel et al., "Fate of neutral-charged gold nanoparticles in the roots of the *Hordeum vulgare* L. cultivar Karat," Scientific Reports, vol. 7, pp. 3014, (2017).
Moghimi et al., "A novel approach to assess salt stress tolerance in wheat using hyperspectral imaging," Frontiers in Plant Science, vol. 9, pp. 1182, (2018).
Mohammadi et al., "Influence of nano-iron oxide and zinc sulfate on physiological characteristics of peppermint." Communications in Soil Science and Plant Analysis, vol. 49, pp. 2315, (2018).
Morrissey et al., "Iron uptake and transport in plants: the good, the bad, and the ionome," Chemical Reviews, vol. 109, pp. 4553, (2009).
Mortimer et al., "Potential of hyperspectral imaging microscopy for semi-quantitative analysis of nanoparticle uptake by protozoa," Environmental Science & Technology, vol. 48, pp. 8760, (2014).
Palchoudhury et al., "Enhanced legume root growth with pre-soaking in α-Fe2O3 nanoparticle fertilizer," RSC Advances, vol. 8(43), pp. 24075-24083 (2018). doi: 10.1039/C8RA04680H.
Palchoudhury et al., "A facile and cost-effective method for separation of oil-water mixtures using polymer-coated iron oxide nanoparticles," Environmental Science & Technology, vol. 48, pp. 14558, (2014).
Pequerul et al., "A rapid wet digestion method for plant analysis." In Optimization of Plant Nutrition, Springer: 1993; pp. 3-6.
Petry et al., "Review: The potential of the common bean (*Phaseolus vulgaris*) as a vehicle for iron biofortification." Nutrients, vol. 7, pp. 1144, (2015).
Price et al., "Control by iron of chlorophyll formation and growth in euglena gracilis." Plant Physiology, vol. 39, pp. 862, (1964).
Pundir et al., "Leaf types and their genetics in chickpea (*Cicer-arietinum* L)," Euphytica, vol. 45, pp. 197, (1990).
Rai et al., "Nanoparticle-plant interaction: Implications in energy, environment, and agriculture," Environment International, vol. 119, pp. 1, (2018).
Raju et al., "Biogenic green synthesis of monodispersed gum kondagogu (Cochlospermum gossypium) iron nanocomposite material and its application in germination and growth of mung bean (*Vigna radiata*) as a plant model," IET Nanobiotechnology, vol. 10, pp. 141, (2016).
Raliya et al., "Nanofertilizer for precision and sustainable agriculture: current state and future perspectives," Journal of Agricultural and Food Chemistry, vol. 66, pp. 6487, (2017).
Ren et al., "Physiological Investigation of Magnetic Iron Oxide Nanoparticles Towards Chinese Mung Bean," Journal of Biomedical Nanotechnology, vol. 7, pp. 677, (2011).
Roschzttardtz et al, "New insights into Fe localization in plant tissues," Frontiers in Plant Science, vol. 4, pp. 350, (2013).
Rui et al., "Iron oxide nanoparticles as a potential iron fertilizer for peanut (*Arachis hypogaea*)," Frontiers in Plant Science, vol. 7, pp. 815, (2016).
Rui et al., "Metal oxide nanoparticles alter peanut (*Arachis hypogaea*L.) physiological response and reduce nutritional quality: a life cycle study," Environmental Science-Nano, vol. 5, pp. 2088, (2018).
Sekine et al., "Complementary imaging of silver nanoparticle interactions with green algae: dark- field microscopy, electron microscopy, and nanoscale secondary ion mass spectrometry," ACS Nano, vol. 11, 30 pp. 10894, (2017).
Srivastava et al., "Seed treatment with iron pyrite (FeS2) nanoparticles increases the production of spinach," RSC Advances, vol. 4, pp. 58495, (2014).
Srivastava et al., "Iron pyrite, a potential photovoltaic material, increases plant biomass upon seed pretreatment." Materials Express, vol. 4, pp. 23, (2014).
Stegemeier et al. "Uptake and distribution of silver in the aquatic plant *Landoltia punctata* (Duckweed) exposed to silver and silver sulfide nanoparticles," Environmental Science & Technology, vol. 51, pp. 4936, (2017).
Van Nhan et al., "The effects of Fe2O3 nanoparticles on physiology and insecticide activity in non- transgenic and Bt-transgenic cotton," Frontiers in Plant Science, vol. 6, pp. 1263, (2016).
Yuan et al., "New insights into the cellular responses to iron nanoparticles in Capsicum annuum," Scientific Reports, vol. 8, pp. 3228, (2018).
Yunta et al., "Blood meal-based compound. good choice as iron fertilizer for organic farming," Journal of Agricultural and Food Chemistry, vol. 61, pp. 3995, (2013).
Zhu et al., "Uptake, translocation, and accumulation of manufactured iron oxide nanoparticles by pumpkin plants," Journal of Environmental Monitoring, vol. 10, pp. 713, (2008).
Jangir et al., "Nano pyrite (FeS2) root priming enhances chilli and marigold production in nutrients-deficient soil: a nano strategy for fertiliser tuning," Applied Nanoscience, vol. 9, pp. 327-340 (2019).

* cited by examiner

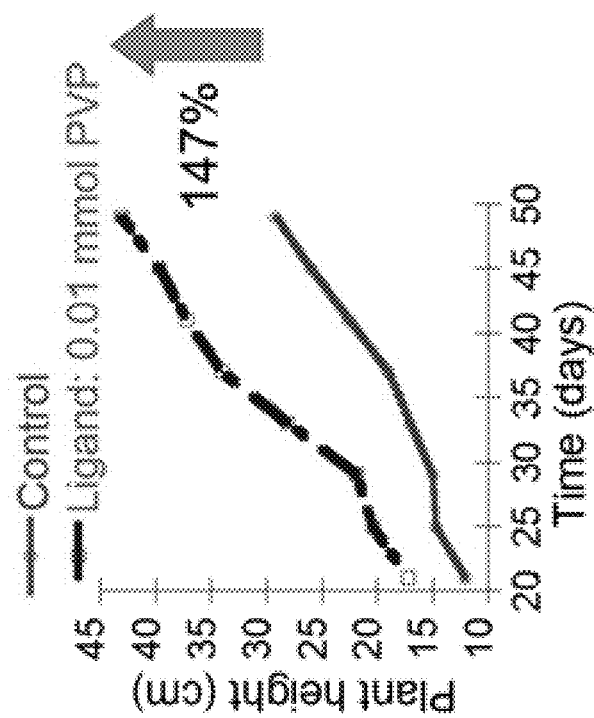
FIG. 22C
FIG. 22A
FIG. 22B

SEED PRE-SOAK TECHNOLOGY WITH A DROP OF HEMATITE NANOPARTICLE FERTILIZER FOR INCREASED PLANT GROWTH

RELATED APPLICATIONS

The presently disclosed subject matter claims the benefit of U.S. Provisional Patent Application Ser. No. 62/992,357, filed Mar. 20, 2020; the disclosure of which is incorporated herein by reference in its entirety.

TECHNICAL FIELD

The presently disclosed subject matter relates to a fertilizer comprising iron oxide (e.g., hematite) nanoparticles, to methods of preparing the nanoparticles, and to methods of enhancing the growth of plants by pre-soaking seeds or other materials being germinated with the fertilizer.

ABBREVIATIONS

°=degree
° C.=degrees Celsius
%=percentage
$\alpha Fe_2O_3$=hematite
µm=micrometer
acac=acetylacetonate
DI=deionized
DLS=dynamic light scattering
Fe=iron
FTIR=Fourier transform infrared
g=gram
h=hour
ICP=inductively coupled plasma
kDa=kilodalton
L=liter
mg=milligram
mL=milliliter
mm=millimeter
mmol=millimole
mol=mole
mV=millivolt
$M_w$=molecular weight
nm=nanometer
NP=nanoparticle
OES=optical emission spectroscopy
PEI=polyethyleneimine
PVP=polyvinyl pyrrolidone
SEM=scanning electron microscopy
TREG=triethyleneglycol

BACKGROUND

Iron (Fe) is a key element for several cellular reactions in plants such as respiration and the formation of chlorophyll required for photosynthesis. Plants have adopted a mechanism to acquire this essential nutrient from the soil using an apoplastic pathway through the roots, but limited Fe is available in some soil types or in soils with excessive agricultural use [1,2]. Fe deficiency is known to cause chlorosis in plants [3]. Therefore, Fe-enriching fertilizers can be used to ensure optimum Fe delivery to the plants.

There is emerging interest in the use of nanoparticle (NP) fertilizers for enhanced agricultural and bio-energy crop production to meet the growing food and energy demands of the world. One objective in developing NP fertilizers is to effectively deliver nutrients to plants without adding large quantities of fertilizer to the environment. However, to date, most reports on NP fertilizers have involved addition of nanoparticles to a hydroponic system or to the soil.

Accordingly, there is an ongoing need for the development of new NP fertilizers, including Fe-enriching NP fertilizers and to methods of using the fertilizers in a cost effective manner and with minimal addition of the fertilizers to the environment, while at the same time, effectively enhancing plant growth.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, the presently disclosed subject matter provides a method of enhancing plant growth, the method comprising contacting a seed or other germination-capable plant tissue with a drop of an aqueous composition comprising an iron oxide nanoparticle for a period of time prior to planting said seed or other germination-capable plant tissue.

In some embodiments, the period of time is sufficient for the seed or other germination-capable plant tissue to germinate. In some embodiments, the period of time is about 2 days to about 5 days. In some embodiments, the seed or other germination-capable plant tissue is placed on a wetted cellulosic substrate prior to or during said period of time.

In some embodiments, the seed is a seed of a plant species planted for food or for bio-energy production. In some embodiments, the seed is a seed of a plant species selected from the group comprising corn, soybean, a grass, and a legume.

In some embodiments, the drop has an iron oxide nanoparticle concentration of between about 0.01 grams per liter ($gL^{-1}$) and about 1.5 $gL^{-1}$. In some embodiments, the drop provides about 10 micrograms (µg) of Fe to 75 µg of iron per seed or other germination-capable plant tissue.

In some embodiments, the iron oxide nanoparticle comprises a core or a coating layer comprising hematite. In some embodiments, the iron oxide nanoparticle comprises one or more polymeric organic ligands. In some embodiments, the one or more polymeric organic ligands are selected from polyvinylpyrrolidone (PVP) and polyethyleneimine (PEI).

In some embodiments, the iron oxide nanoparticle has an average hydrodynamic diameter of about 50 nanometers (nm) to about 250 nm as measured by dynamic light scattering. In some embodiments, the iron oxide nanoparticle has a surface charge of about −10 mV to about 40 mV. In some embodiments, the iron oxide nanoparticle has a surface charge of about 1.0 mV to about 35 mV.

In some embodiments, the iron oxide nanoparticle is prepared from a reaction mixture comprising an iron precursor and one or both of PVP and PEI, and wherein said reaction mixture comprises about 0 moles to about 0.04 moles of PVP per mole of iron precursor and about 0 moles to about 0.01 moles of PEI per mole of iron precursor. In some embodiments, the iron precursor is iron (III) acetylacetonate (Fe(acac)$_3$). In some embodiments, the reaction mixture comprises about 0 moles to about 0.030 moles of PVP per mole of iron precursor and about 0 moles to about 0.010 moles of PEI per mole of iron precursor. In some embodiments, the iron oxide nanoparticle is prepared from a reaction mixture selected from the group comprising a reaction mixture comprising about 0.035 moles of PVP and about 0.0025 moles of PEI per mole of iron precursor; a reaction mixture comprising about 0.030 moles of PVP and about 0.0025 moles of PEI per mole of iron precursor; a reaction mixture comprising about 0.005 moles of PVP per mole of iron precursor; a reaction mixture comprising about 0.005 moles of PVP and about 0.00415 moles of PEI per mole of iron precursor; and a reaction mixture comprising about 0.005 moles of PEI per mole of iron precursor.

In some embodiments, the iron nanoparticle is prepared from a reaction mixture comprising an iron precursor and the one or more polymeric organic ligands, and wherein a ratio P:C of moles of iron precursor to total moles of said one or more polymeric organic ligands is about 20 or more. In some embodiments, the ratio P:C is about 30 to about 200.

In some embodiments, the seed or other germination-capable plant tissue is planted in a soil that has been exposed to a traditional fertilizer or wherein plants growing from said seed or other germination-capable plant tissue are treated with a traditional fertilizer. In some embodiments, enhancing plant growth comprises one or more of increasing growth rate, increasing plant height, increasing root growth, increasing leaf production, increasing fruit production, increasing the rate of fruit production, increasing seed pod production, increasing plant survival rate, and increasing plant life span compared to a plant from an untreated seed. In some embodiments, the seed is a seed of legume species, and the method provides an increase in plant growth of about 230% to about 830% compared to a plant grown from an untreated seed. In some embodiments, the seed is a corn seed, and the method provides a corn plant with a growth rate about 147% that of a corn plant grown from an untreated corn seed. In some embodiments, the seed is a soybean seed, and the method provides a soybean plant with a growth rate about 150% that of a soybean plant grown from an untreated soybean seed. In some embodiments, the other germination-capable plant tissue is a seed potato piece.

In some embodiments, the presently disclosed subject matter provides a fertilizer composition comprising an iron oxide nanoparticle, wherein said iron oxide nanoparticle comprises iron oxide and one or more polymeric organic ligands, and wherein the ratio of moles of iron to moles of polymeric organic ligand is about 30 to about 200; and wherein the iron oxide nanoparticle has a surface charge of about 1.0 mV to about 35 mV. In some embodiments, the iron oxide nanoparticle has a hydrodynamic diameter of about 50 nm to about 250 nm as measured by dynamic light scattering.

In some embodiments, the iron oxide nanoparticle comprises hematite. In some embodiments, the one or more polymeric organic ligands are selected from the group comprising PVP and PEI. In some embodiments, the iron oxide nanoparticle is prepared from a reaction mixture comprising an iron precursor and one or both of PVP and PEI, and wherein said reaction mixture comprises about 0 moles to about 0.03 moles of PVP per mole of iron precursor and about 0 moles to about 0.01 moles of PEI per mole of iron precursor.

In some embodiments, the iron precursor is Fe(acac)$_3$. In some embodiments, the nanoparticle is prepared from a reaction mixture selected from the group comprising a reaction mixture comprising about 0.030 moles of PVP and about 0.0025 moles of PEI per mole of iron precursor; a reaction mixture comprising about 0.005 moles of PVP per mole of iron precursor; a reaction mixture comprising about 0.005 moles of PVP and about 0.00415 moles of PEI per mole of iron precursor; and a reaction mixture comprising about 0.005 moles of PEI per mole of iron precursor.

In some embodiments, the iron oxide nanoparticle is provided in an aqueous solution or dispersion. In some embodiments, the concentration of iron oxide nanoparticle in the aqueous solution or dispersion is about 0.010 gL$^{-1}$ to about 1.5 gL$^{-1}$.

In some embodiments, the presently disclosed subject matter provides a method of preparing an iron oxide nanoparticle fertilizer composition, the method comprising: (a) dissolving one or more polymeric organic ligands in a solvent, wherein the solvent comprises a polyol to provide a ligand solution; (b) adding an iron precursor to the ligand solution to provide a reaction mixture; and (c) heating the reaction mixture under an inert atmosphere for a period of time to provide iron oxide nanoparticles. In some embodiments, the polyol is a diol. In some embodiments, the diol is triethylene glycol.

In some embodiments, the one or more polymeric organic ligands are selected from PVP and PEI. In some embodiments, the iron precursor is iron (III) acetylacetonate.

In some embodiments, the reaction mixture is heated to about 290° C. In some embodiments, the period of time is about one hour.

In some embodiments, the ratio of moles of iron precursor in the reaction mixture to total moles of polymeric organic ligand is about 30 or more. In some embodiments, the ratio of moles of iron precursor in the reaction mixture to total moles of polymeric organic ligand is about 30 to about 200.

In some embodiments, the reaction mixture comprises about 0 moles to about 0.03 moles of PVP per mole of iron precursor and about 0 moles to about 0.01 moles of PEI per mole of iron precursor. In some embodiments, the reaction mixture is selected from the group comprising a reaction mixture comprising about 0.030 moles of PVP and about 0.0025 moles of PEI per mole of iron precursor; a reaction mixture comprising about 0.005 moles of PVP per mole of iron precursor; a reaction mixture comprising about 0.005 moles of PVP and about 0.00415 moles of PEI per mole of iron precursor; and a reaction mixture comprising about 0.005 moles of PEI per mole of iron precursor.

Thus, it is an object of the presently disclosed subject matter to provide a method of enhancing plant growth and to a related iron oxide nanoparticle fertilizer composition and method of making the iron oxide nanoparticles of the fertilizer composition.

An object of the presently disclosed subject matter having been stated hereinabove, and which is achieved in whole or in part by the compositions and methods disclosed herein, other objects will become evident as the description proceeds when taken in connection with the accompanying Figures as best described herein below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 22A is a photographic image of a control corn plant grown from a seed pre-soaked with a drop of deionized (DI) water.

FIG. 22B is a photographic image of a corn plant grown from a seed pre-soaked with a drop of a hematite nanoparticle fertilizer prepared using 0.01 millimole (mmol) polyvinylpyrrolidone (PVP).

FIG. 22C is a graph showing the time-dependent growth (plant height in centimeters (cm) versus time in days) of a control corn plant as described for FIG. 22A (solid line, circles) and a corn plant grown from a hematite nanoparticle (NP) pre-soaked seed as described for FIG. 22B (dashed line, squares).

DETAILED DESCRIPTION

Figure 1A:
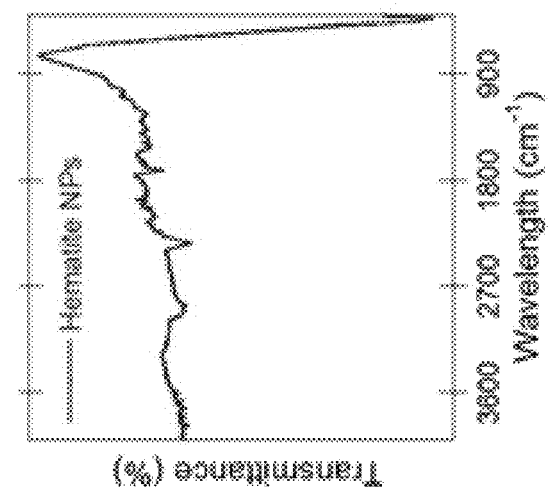
FIG. 1A is a hydrodynamic size plot (intensity/volume/number measured as a percentage (%) versus diameter size measured in nanometers (nm)) of an exemplary hematite nanoparticle (NP) fertilizer of the presently disclosed subject matter.

According to an aspect of the presently disclosed subject matter a modified seed pre-soak method of applying fertilizer is described. More particularly, in some embodiments, the presently disclosed modified seed pre-soak method uses a drop of a Fe-enriching iron oxide (e.g., hematite) nanoparticle (NP) dispersion or solution (i.e., a solution or dispersion comprising a NP comprising a core or coating layer comprising iron oxide) to pre-soak a seed or other plant tissue being germinated to enhance plant growth and production. For example, pre-soaked seeds provided taller plants, plants with an increased survival span, increased fruit production per plant, and faster fruit production as compared to plants from control seeds. Plants from the pre-soaked seeds also provided healthy second-generation plants.

In addition, a multimodal material characterization approach combining three techniques, hyperspectral imaging, Fourier transform Infrared spectroscopy (FTIR), and inductively coupled plasma optical emission spectroscopy (ICP-OES) was used to evaluate the internalization and transport of the nanoparticle fertilizer within the plants. Results indicated that the iron oxide (e.g., hematite) NPs were transported through the roots and stem and localized in the leaves after 10 days of growth in pots of soil.

In some embodiments, the presently disclosed pre-soak method for enhanced plant growth provides the required iron nutrient to the plants in the form of a single drop of a high throughput NP fertilizer that is not added directly to the soil or aqueous environment, unlike conventional fertilizers. Accordingly, in some embodiments, the presently disclosed subject matter provides a seed pre-soaking method employing hematite NPs that provides a sustainable technology for the production of agricultural and bio-energy crops, as well as hematite NP fertilizer solutions for use therein. It is further believed that the presently disclosed modified seed pre-soaking methods using a drop of Fe-enriching NP fertilizer provides an attractive approach in enhancing plant growth and health, while minimizing environmental impacts.

The presently disclosed subject matter also provides additional iron oxide (e.g., hematite) NP fertilizer formulations and a method of preparing the NP fertilizers. The size, shape, and properties of the nanoparticles can be altered by varying the surface ligands used in preparation of the NPs.

The presently disclosed subject matter will now be described more fully. The presently disclosed subject matter can, however, be embodied in different forms and should not be construed as limited to the embodiments set forth herein below and in the accompanying Example. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, diameter, length, width, temperature, concentration, volume, and so forth used herein are to be understood as being modified in all instances by the term "about". Accordingly, unless indicated to the contrary, the numerical parameters set forth in this specification are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

The term "nanoparticle" refers to a structure having at least one region with a dimension (e.g., length, width, diameter, etc.) of about 1000 nm or less. In some embodiments, the dimension is smaller (e.g., less than about 750 nm, less than about 500 nm, less than about 400 nm, less than about 350 nm, less than about 300 nm, less than about 250 nm, less than about 200 nm, less than about 175 nm, less than about 150 nm, or less than about 125 nm). In some embodiments, the dimension is less than about 100 nm. In some embodiments, the term "nanoparticle" refers to a structure having at least one region with a dimension (e.g., length, width, diameter, etc.) ranging from about 25 nm to about 500 nm or about 50 nm to about 250 nm. In some embodiments, the presently disclosed subject matter reports hydrodynamic sizes of nanoparticles, which are known to be higher than the core size of the nanoparticles due to surface polymer coating.

In some embodiments, the nanoparticle is approximately spherical. When the nanoparticle is approximately spherical, the characteristic dimension can correspond to the diameter of the sphere. In addition to spherical shapes, the nanoparticle or other nanoscale material can be disc-shaped, oblong, polyhedral, rod-shaped, or cubic. A nanoscale material can also be irregularly shaped or comprise clusters or aggregates of spheres, rods, discs, or cubes.

The nanoparticle can comprise a core region (i.e., the space between the outer dimensions of the particle) and an outer surface (i.e., the surface that defines the outer dimensions of the particle). In some embodiments, the nanoparticle can have an iron oxide or iron oxide aggregate core with "capping" polymeric organic ligands that form an outer coating layer over the iron oxide. The capping ligands can include chemical functional groups that comprise an unshared electron pair that can form coordinate bonds with the Fe in the iron oxide. In some embodiments, the nanoparticle comprises a core material (e.g., a metal, metal alloy or polymer) with an iron oxide coating layer over the core material and one or more capping polymeric organic ligands attached to Fe ions in the coating layer.

A "coordination complex" is a compound in which there is a coordinate bond between a metal ion and an electron pair donor, ligand or chelating group. Thus, ligands or chelating groups are generally electron pair donors, molecules or molecular ions having unshared electron pairs available for donation to a metal ion.

The term "coordinate bond" refers to an interaction between an electron pair donor and a coordination site on a metal ion resulting in an attractive force between the electron pair donor and the metal ion. The use of this term is not intended to be limiting, in so much as certain coordinate bonds also can be classified as having more or less covalent character (if not entirely covalent character) depending on the characteristics of the metal ion and the electron pair donor.

As used herein, the term "ligand" refers generally to a species, such as a molecule (e.g., a polymer), or ion, which interacts, e.g., binds, in some way with another species. More particularly, as used herein, a "ligand" can refer to a molecule or ion that binds a metal ion in solution to form a "coordination complex." See Martell, A. E., and Hancock, R. D., *Metal Complexes in Aqueous Solutions*, Plenum: New York (1996), which is incorporated herein by reference in its entirety. The terms "ligand" and "chelating group" can be used interchangeably. The term "capping ligand" can refer to a molecule or group that bonds to a metal ion on the outer surface of a nanoparticle core. Ligands can have at least one group with an unshared electron pair. Polymeric organic capping ligands can have multiple groups with unshared electron pairs separated by, for example, an alkylene or arylene group. Groups with unshared electron pairs, include, but are not limited to, —CO$_2$H, —NO$_2$, amino, hydroxyl, thio, thioalkyl, —B(OH)$_2$, —SO$_3$H, PO$_3$H, phosphonate, and heteroatoms (e.g., nitrogen, oxygen, or sulfur) in heterocycles.

The terms "polymer" and "polymeric" refer to chemical structures that have repeating units (i.e., multiple copies of a given chemical substructure). Polymers can be formed from polymerizable monomers. A polymerizable monomer is a molecule that comprises one or more moieties that can react to form bonds (e.g., covalent or coordination bonds) with moieties on other molecules of polymerizable monomer. In some embodiments, each polymerizable monomer molecule can bond to two or more other molecules/moieties. In some cases, a polymerizable monomer will bond to only one other molecule, forming a terminus of the polymeric material.

Polymers can be organic, or inorganic, or a combination thereof. As used herein, the term "inorganic" refers to a compound or composition that contains at least some atoms other than carbon, hydrogen, nitrogen, oxygen, sulfur, phosphorous, or one of the halides. Thus, for example, an inorganic compound or composition can contain one or more silicon atoms and/or one or more metal atoms.

As used herein "organic polymers" are those that do not include silica or metal atoms in their repeating units. Exemplary organic polymers include polyvinylpyrrolidone (PVP), polyesters, polyamides, polyethers, polydienes, and the like. Some organic polymers contain biodegradable linkages, such as esters or amides, such that they can degrade overtime under biological conditions.

The term "hydrophilic polymer" as used herein generally refers to hydrophilic organic polymers, such as but not limited to, polyvinylpyrrolidone (PVP), polyvinylmethylether, polymethyloxazoline, polyethyloxazoline, polyhydroxy-propyloxazoline, polyhydroxypropylmethacrylamide, polymethy-acrylamide, polydimethylacrylamide, polyhydroxylpropylmethacrylate, polyhydroxyethylacrylate, hydroxymethylcellulose, hydroxyethylcellulose, polyethyleneimine (PEI), polyethyleneglycol (i.e., PEG) or another hydrophilic poly(alkyleneoxide), polyglycerine, and polyaspartamide. The term "hydrophilic" refers to the ability of a molecule or chemical species to interact with water. Thus, hydrophilic polymers are typically polar or have groups that can hydrogen bond to water.

The term "drop" refers to a volume of a liquid (e.g., an iron oxide nanoparticle solution) measured to be about 0.05 milliliters (mL). In some embodiments, the term drop refers to a volume of 0.03 mL to about 0.07 mL. In some embodiments, "drop" refers to 0.05 mL of material.

The term "traditional fertilizer" as used herein refers to a fertilizer used to supply nitrogen (N), phosphorus (P) and/or potassium (K) (e.g., a NPK fertilizer) that is typically applied to soil or to the leaves of a growing plant.

The term "conventional fertilizer" refers to a non-nanoparticle composition for delivering a plant nutrient or nutrients.

II. General Considerations

Recently, there has been a thrust to develop NP fertilizers because conventional fertilizers are required in large quantities owing to their slower absorption by plants [4,5,6]. NP fertilizers can facilitate tunable delivery of nutrients to plants. Therefore, NP fertilizers are seen as candidates for enhancing production of agricultural and bio-energy crops to meet the growing food and energy demands of the world population [5,7,8,9].

Recent studies have been reported on the use of Fe-enriching NPs, such as Fe NPs, iron pyrite NPs, and iron oxide NPs [10-19]. However, while these studies demonstrate the potential of NPs as Fe-enriching fertilizers and chlorosis treatment agents for agricultural and bio-energy crops, most of these previous reports involved direct addition of the NP fertilizer to the soil or the hydroponic system, which can be unattractive in terms of environmental sustainability. Studies have shown stress response and reduction of amino acids in plants with excess addition of NP fertilizers [20]. Accordingly, there is a need for a more environmental-friendly strategy that increases plant growth with use of a minimum quantity of the fertilizer while also minimizing the addition of fertilizer to the environment.

Recently, a seed pre-soak strategy was reported where soaking embryonic seeds of legumes in liquid dispersions of iron oxide NPs showed enhanced root growth by 88-366%, but more than 4 mL of NPs were required for each seed [21]. Minimizing the quantity of NP dispersions required would make the seed pre-soak strategy more effective for practical applications.

A better understanding of the pathway of internalization, interaction, and translocation of NP fertilizers within plants can be helpful both for risk assessment and for synthesizing high-efficiency NP fertilizers [1,22,23,24]. Most plant-NP interaction studies to date have focused on physiological aspects, as it can be challenging to find a material characterization method capable of detecting the low concentrations of NPs uptaken within the complex biological matrix of plants [25]. Imaging techniques like optical and electron microscopy have traditionally been used to detect NPs within plant cells [15,21,26, 27]. However, optical microscopy cannot resolve objects less than 250 nm apart due to the diffraction limit of visible light, even though the technique is rapid and requires negligible sample preparation. Electron microscopy can easily resolve nanoscale objects, but the required sample preparation stages, such as staining, ultrathin sectioning, sputter-coating, and labeling, increase artifacts in the images. Recently, darkfield hyperspectral imaging has emerged as a promising visualization tool to both detect and map the localization of NPs within complex microenvironments [28]. The charge-dependent uptake and mobility of Au NPs by the roots of *Arabidopsis thaliana* could be demonstrated using this technique [29]. When combined with an elemental analysis technique like x-ray tomography or mass spectroscopy, hyperspectral imaging can provide further reliable insights on plant-NP interactions [29,30]. Another method requiring minimum sample preparation, Fourier transform infrared spectroscopy (FTIR) has also proved useful in understanding plant-NP interactions via chemical composition analysis in several reports.

As described in the Examples below, the effectiveness of Fe-enriching iron oxide (e.g., hematite ($\alpha$-$Fe_2O_3$)) NP fertilizer to boost plant growth and production was investigated using four different species of legumes as model plants (i.e., chickpea, green gram, black beans, and red beans), as well as in grass, corn, potatoes, and soybean. The NPs of the presently disclosed subject matter were synthesized via a representative modified polyol wet-chemical approach using a ligand mixture of polyethyleneimine/polyvinyl pyrrolidone. For instance, in studies with the legumes, the different types of legume plants were grown in same sized pots filled with the same soil type to keep all growth conditions the same other than the NP treatment. The presently disclosed "modified seed pre-soak" strategy was investigated to minimize the quantity of NP fertilizer required and to prevent addition of NPs directly to the soil. Two different concentrations of the hematite NP fertilizer were used to investigate Fe concentration-dependent growth trend in the different legume plants. In addition, a multimodal material characterization strategy combining hyperspectral imaging, FTIR, and ICP-OES was developed for gaining insights on the internalization, transport, and localization of the NP fertilizer within the plants. The presently disclosed modified seed pre-soaking method using one drop of the NP fertilizer can be beneficial in promoting enhanced agricultural production in nutrient-deficient environments in a cost-effective and sustainable fashion. The multimodal material characterization strategy can be significant both in understanding the mechanism of plant-NP interactions and risk assessment of the new NP fertilizers.

The presently disclosed subject matter provides, in some embodiments, a method of enhancing plant growth by up to 830% with a fertilizer composition comprising polymer coated-hematite nanoparticles (NPs) using a modified pre-soak method. For example, as described hereinbelow, seeds of various legumes (e.g., chickpea, black bean, red bean, green gram and green pea) were pre-soaked in a moist paper towel with one drop of the hematite NP fertilizer composition at room temperature. The seeds treated with the hematite NPs using the modified pre-soak method were then potted in soil. The legume plants show a 230-830% increase in growth, depending upon the plant species when compared to untreated control legume plants potted in the same soil. The presently disclosed modified pre-soak method also boosts the vitality of the legume plants by at least 10-15 days. It can further facilitate two-fold faster fruit production and nearly two-times more fruit per plant compared to control legume plants grown under the same conditions. Legume plants grown from seeds treated with the iron oxide (e.g., hematite) NP fertilizer also produce healthy next-generation plants. By way of example and not limitation, in the legume plants, one drop of aqueous hematite NPs having a 0.022 g/L Fe concentration appeared to provide the best results for boosting plant growth, vitality, and production. Enhancement of growth of corn, soybean, grass, and potatoes using the presently disclosed "modified pre-soak" method was also observed. In addition, seeds treated according to the presently disclosed "modified pre-soak" method were also planted in traditional fertilizer-treated soil, showing the compatibility of the presently disclosed method with practical conditions in the field.

III. Method for Enhancing Plant Growth

In some embodiments, the presently disclosed subject matter provides a method for enhancing plant growth through the use of iron oxide (e.g., hematite) NPs. The presently disclosed "modified pre-soak" method includes contacting a seed or other plant tissue to be germinated (e.g., a seed potato piece) with a small volume (less than about 1 mL, less than about 0.5 mL, less than about 0.4 mL, less than about 0.3 mL, less than about 0.2 mL, less than about 0.15 mL, less than about 0.10 mL, or about 0.5 ml or less) of an aqueous solution or dispersion comprising the nanoparticles prior to planting the seed or other material in soil. Typically, the method involves keeping the seed or other plant tissue under conditions suitable for germination until the seed or other tissue begins to sprout prior to planting, usually within 2-5 days. Compared to previous NP growth enhancement methods, the presently disclosed method minimizes the use of nanoparticle fertilizer and water, while also minimizing introduction of the nanoparticle fertilizer into the environment.

In some embodiments, the presently disclosed subject matter provides a method of enhancing plant growth wherein the method comprises contacting a seed or other germination-capable plant tissue (e.g., a plant slip or a seed potato slice) with a drop (i.e., a single drop of about 0.05 mL) of an aqueous composition (i.e., an aqueous solution or dispersion) comprising an iron oxide nanoparticle for a period of time prior to planting said seed or other germination-capable plant tissue. The period of time can be a period of time sufficient for the seed or other tissue to germinate (e.g., for a shoot or shoots to begin to grow). The period of time can be a few days, e.g., about 1, 2, 3, 4, 5, 6, 7, 8, 9, or 10 days. In some embodiments, the period of time is about 2 days to about 5 days. During this period of time, the seed or other tissue contacted with the drop of aqueous solution or dispersion can be in kept under suitable germination conditions, e.g., in a humid environment, in the presence of oxygen, and at a suitable temperature for germination in the relevant plant species. In some embodiments, the drop contacted seed or other tissue can be kept at room temperature (i.e., about 18° C. to 25° C.) with access to air and/or oxygen. In some embodiments, a suitable humid environment is provided by placing the seed or seed potato piece in a partially closed container, where the seed or seed potato piece is placed directly on or near a wetted cellulosic material, such as a wet paper towel or other material.

The identity of the plant whose growth is to be enhanced by the presently disclosed modified pre-soak method is not particularly limited and includes flowers, fruits, legumes, vegetables, herbs, grasses, grains, shrubs, and trees. Thus, the plant can be selected from edible plants, ornamental plants, plants grown for bio-energy production, or plants grown to provide a product of commercial interest (e.g., cotton, rubber, etc.). In some embodiments, the seed is a seed of a plant species planted for food or for bio-energy (e.g., bio-ethanol) production. In some embodiments, the seed is a seed of a plant species selected from the group including, but not limited to, corn, soybean, a grass (e.g., fescue grass), and a legume (e.g., chickpea, black bean, red bean, or green gram). In some embodiments, the germination-capable plant tissue being contacted with the aqueous NP solution or dispersion is a seed potato piece (e.g., a slice of a seed potato that includes at least one "eye" (i.e., a stem bud from which a shoot can grow).

In some embodiments, the drop of the aqueous composition has an iron oxide nanoparticle concentration that is at least about 0.01 grams per liter ($gL^{-1}$). In some embodiments, the iron oxide nanoparticle concentration is about 0.01 $gL^{-1}$ to about 1.5 $gL^{-1}$. In some embodiments, the single drop comprises about 10 µg to about 75 µg of Fe and the method involves treatment of a single seed or other germination-capable plant tissue (e.g., seed potato slice) with about 10 µg to about 75 µg Fe. In some embodiments, the iron oxide nanoparticle concentration is about 0.02 $gL^{-1}$ to about 1.5 $gL^{-1}$ (e.g., about 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, or about 1.5 $gL^{-1}$). In some embodiments, the iron oxide nanoparticle concentration is about 0.022 $gL^{-1}$ to about 1.1 $gL^{-1}$. In some embodiments, the iron oxide nanoparticle concentration is about 0.022 $gL^{-1}$ or about 1.1 $gL^{-1}$.

In some embodiments, the single drop comprises about 10 µg to about 75 µg of Fe and the method involves treatment of a single seed or other germination-capable plant tissue (e.g., seed potato slice) with about 10 µg to about 75 µg Fe, including about 10 µg, about 15 µg, about 20 µg, about 25 µg, about 30 µg, about µg, about 40 µg, about 45 µg, about 50 µg, about 55 µg, about 60 µg, about 65 µg, about 70 µg or a75 µg Fe.

The iron oxide nanoparticle can comprise iron oxide and one or more polymeric organic ligands. In some embodiments, the iron oxide comprises or consists of hematite. In some embodiments, the iron oxide of the NP core or coating layer comprises or consists of hematite. However, the iron oxide NPs can also comprise other iron oxides, including mixed Fe(II)/Fe(III) oxides, such as magnetite and/or Fe(III) oxides other than hematite (i.e., $\alpha$-$Fe_2O_3$), such as $\beta$-$Fe_2O_3$, $\gamma$-$Fe_2O_3$ (i.e., maghemite) and $\epsilon$-$Fe_2O_3$.

The one or more polymeric organic ligands can act as "capping" ligands by bonding to Fe ions at the surface of the iron oxide NP core, thereby providing the NP with a surface coating of the polymeric organic ligand. Any suitable hydrophilic organic polymer or mixture thereof can be used as the polymeric organic ligand(s). In some embodiments, the one or more polymeric organic ligands comprise or consist of PVP, PEI, or both PEI and PVP. Thus, in some embodiments, the one or more polymeric organic ligand is PVP. In some embodiments, the one or more polymeric organic ligand is PEI. In some embodiments, both PVP and PEI are used as polymeric organic ligands.

The polymeric organic ligands can play a role during both the nucleation and growth phases of NP synthesis. In addition, different ligands can show different binding affinities to the nanoparticle surfaces and the have different surface packing. Accordingly, selection of the one or more polymeric organic ligands and the amount of the ligand or ligands can be varied to tailor NP properties, such as size, shape, and surface charge. In some embodiments, the NPs have a hydrodynamic diameter (i.e., an average hydrodynamic diameter) of about 50 nm to about 250 nm as measured by dynamic light scattering (DLS). In some embodiments, the hydrodynamic diameter is about 75 to about 200 nm (e.g., about 75, 80, 85, 90, 95, 100, 105, 110, 115,120, 125, 130, 135, 140, 145, 150, 155, 160, 165, 170, 175, 180, 185, 190, 195 or about 200 nm). In some embodiments, the hydrodynamic diameter is about 75 nm to about 175 nm.

In some embodiments, the iron oxide NPs have a surface charge of about –mV to about 40 mV. In some embodiments, iron oxide NPS have a positive surface charge. In some embodiments, the surface charge of the NPs is about 1.0 mV to about 35 mV (e.g., about 1, 2.5, 5, 7.5, 10, 12.5, 15, 17.5, 20, 22.5, 25, 27.5, 30, 32.5, or about 35 mV).

In some embodiments, the nanoparticles are prepared by from a reaction mixture comprising an iron precursor and the one or more polymeric organic ligands. The reaction mixture can be prepared, for example, in a polyol solvent. In some embodiments, the one or more polymeric organic ligands comprises or consist of one or both of PVP and PEI. In some embodiments, the reaction mixture comprises about 0 moles to about 0.04 moles of PVP per mole of iron precursor and about 0 moles to about 0.01 moles of PEI per mole of iron precursor. Suitable iron precursors include iron coordination complexes, such as iron (III) coordination complexes. In some embodiments, the iron precursor comprises a single iron cation and one or more metal ion ligands. For example, the iron precursor can include one Fe cation and 1 to 6 metal ion ligands, each including one or more chemical functional groups that can coordinate to the Fe cation. In some embodiments, the iron precursor is iron (III) acetylacetonate ($Fe(acac)_3$).

In some embodiments, the reaction mixture comprises about 0 moles to about 0.030 moles of PVP per mole of iron precursor and about 0 moles to about 0.010 moles of PEI per mole of iron precursor. Thus, in some embodiments, the reaction mixture is free of PVP. In some embodiments, the reaction mixture comprises about 0.001, 0.002, 0.003, 0.004, 0.005, 0.006, 0.007, 0.008, 0.009, 0.010, 0.015, 0.020, 0.025, or about 0.030 moles of PVP per mole of iron precursor. In some embodiments, the reaction mixture is free of PEI. In some embodiments, the reaction mixture comprises about 0.001, 0.002, 0.003, 0.004, 0.005, 0.006, 0.007, 0.008, 0.009, or about 0.01 moles of PEI per mole of iron precursor. In some embodiments, the NPs are prepared from a reaction mixture selected from the group including a reaction mixture comprising about 0.035 moles of PVP and about 0.0025 moles of PEI per mole of iron precursor; a reaction mixture comprising about 0.030 moles of PVP and about 0.0025 moles of PEI per mole of iron precursor; a reaction mixture comprising about 0.005 moles of PVP per mole of iron precursor; a reaction mixture comprising about 0.005 moles of PVP and about 0.00415 moles of PEI per mole of iron precursor; and a reaction mixture comprising about 0.005 moles of PEI per mole of iron precursor.

In some embodiments, the ratio, referred to herein as P:C, of moles of iron precursor to total moles of polymeric organic ligand in the reaction mixture used to prepare the NPs is about 20 or more. In some embodiments, P:C is about 26. In some embodiments, the ratio P:C is about 30 to about 200. In some embodiments, P:C is about 30, about 50, about 75, about 100, about 125, about 150, about 175 or about 200.

Once the "pre-soaked" seed or other germination-capable plant tissue begins to sprout it can be transferred to a growth medium, e.g., soil or an aqueous solution of nutrients used in a hydroponic system. In some embodiments, the seed or other germination-capable plant tissue is planted in soil. In some embodiments, the soil is a soil that has been previously used to grow plants and/or previously exposed to a traditional fertilizer. In some embodiments, the plants that grow from the "pre-soaked" seed or other plant tissue can be treated with a traditional fertilizer after being transferred to a growth medium, e.g., during growth in a soil.

The presently disclosed method can provide enhanced growth and longevity for a variety of plants, including, but not limited to, legumes, potatoes, grasses, corn, and soybean. In some embodiments, the presently disclosed method of enhancing plant growth provides a plant with one or more of the following as compared to a plant grown from an untreated seed or other plant tissue capable of germination or as compared to a plant grown from a seed or other tissue capable of germination treated with a drop of water that does not contain the iron oxide NPs: increased growth rate, increased plant height, increased root growth, increased leaf production (e.g., producing more leaves or larger leaves), increased fruit production (e.g., more fruit or larger fruit), increased rate of fruit production, increased seed pot production, increased (i.e., higher) plant survival rate, and increased (i.e., longer) plant life span. For example, the presently disclosed method can provide increased plant growth (an increased growth rate) of about 230% to about 830% for legume species. In some embodiments, the method can provide a corn plant with a growth rate of about 147% compared to a control plant. In some embodiments, the method can provide a soybean plant with a growth rate about 150% that of a soybean plant grown from an untreated soybean seed.

IV. Iron Oxide Nanoparticles and Methods of Preparation

In some embodiments, the presently disclosed subject matter can provide a family of iron oxide NPs with controlled sizes and surface charge. The size and surface charge of the particles can be tailored based on the choice and amount of the polymeric organic ligands used to prepare the NPs. For example, the ligands can play a role in the nucleation and growth phases of the iron oxide. Packing of the ligands on the nanoparticle surface can also affect NP properties, such as size, morphology, and surface charge.

In some embodiments, the presently disclosed subject matter provides a fertilizer composition comprising an iron oxide NP, wherein said iron oxide NP comprises iron oxide and one or more polymeric organic ligand. The iron oxide can form the core of the NPs, while the one or more polymeric organic ligands can be coordinated to Fe cations on the core surface, thereby forming a coating layer. In some embodiments, the ratio of moles of iron to moles of polymeric organic ligand are about 30 to about 200 (e.g., about 30, 40, 50, 60, 70, 80, 90, 100, 125, 150, 175, 200, 225, 250, 275, or about 300). In some embodiments, the iron oxide NP has a positive surface charge. In some embodiments, the NP has a surface charge of about 1.0 mV to about 35 mV (e.g., about 1, 2.5, 5, 7.5, 10, 12.5, 15, 17.5, 20, 22.5, 25, 27.5, 30, 32.5, or about 35 mV).

In some embodiments, the NPs have a hydrodynamic diameter (i.e., an average hydrodynamic diameter) of about 50 nm to about 250 nm as measured by DLS. In some embodiments, the hydrodynamic diameter is about 75 to about 200 nm (e.g., about 75, 80, 85, 90, 95, 100, 105, 110, 115, 120, 125, 130, 135, 140, 145, 150, 155, 160, 165, 170, 175, 180, 185, 190, 195 or about 200 nm). In some embodiments, the hydrodynamic diameter is about 75 nm to about 175 nm.

In some embodiments, the iron oxide comprises or consists of hematite. In some embodiments, the iron oxide can comprise another iron oxide, such as another Fe(III) oxide or a Fe(II)/Fe(III) oxide.

Suitable polymeric organic ligands include hydrophilic polymers. In some embodiments, the one or more polymeric organic ligands are selected from PVP and PEI. In some embodiments, the one or more polymeric organic ligands comprise or consist of PVP. In some embodiments, the one or more polymeric organic ligands comprise or consist of PEI. In some embodiments, the one or more polymeric organic ligands comprise or consist of both PVP and PEI.

In some embodiments, NPs are prepared from a reaction mixture comprising an iron precursor and one or both of PVP and PEI where the reaction mixture comprises about 0 moles to about 0.03 moles of PVP per mole of iron precursor and about 0 moles to about 0.01 moles of PEI per mole of iron precursor. Thus, in some embodiments, the reaction mixture is free of PVP. In some embodiments, the reaction mixture comprises about 0.001, 0.002, 0.003, 0.004, 0.005, 0.006, 0.007, 0.008, 0.009, 0.010, 0.015, 0.020, 0.025, or about 0.030 moles of PVP per mole of iron precursor. In some embodiments, the reaction mixture is free of PEI. In some embodiments, the reaction mixture comprises about 0.001, 0.002, 0.003, 0.004, 0.005, 0.006, 0.007, 0.008, 0.009, or about 0.01 moles of PEI per mole of iron precursor.

Suitable iron precursors include iron coordination complexes, such as iron (III) coordination complexes. In some embodiments, the iron precursor comprises a single iron cation and one or more metal ion ligands. For example, the iron precursor can include one Fe cation and 1 to 6 metal ion ligands, each including one or more chemical functional groups that can coordinate to the Fe cation. In some embodiments, the iron precursor is iron (III) acetylacetonate (Fe $(acac)_3$).

In some embodiments, the NPs are prepared from a reaction mixture selected from the group including a reaction mixture comprising about 0.030 moles of PVP and about 0.0025 moles of PEI per mole of iron precursor; a reaction mixture comprising about 0.005 moles of PVP per mole of iron precursor; a reaction mixture comprising about 0.005 moles of PVP and about 0.00415 moles of PEI per mole of iron precursor; and a reaction mixture comprising about 0.005 moles of PEI per mole of iron precursor.

In some embodiments, the ratio P:C is about 30 to about 200. In some embodiments, P:C is about 30, about 50, about 75, about 100, about 125, about 150, about 175 or about 200.

In some embodiments, the iron oxide nanoparticle is provided in an aqueous solution or dispersion. In some embodiments, the concentration of iron oxide nanoparticle in the aqueous solution is about 0.010 grams per liter ($gL^{-1}$) to about 1.5 $gL^{-1}$. However, higher concentrations can be prepared, with an intent to dilute the solution or dispersion prior to application to a seed or other germination-capable plant tissue.

In some embodiments, the presently disclosed subject matter provides a method of preparing an iron oxide NP fertilizer composition. In some embodiments, the method comprises preparing iron oxide NPs using a modified polyol synthesis. In some embodiments, the method comprises: (a) dissolving one or more polymeric organic ligands in a solvent, wherein the solvent comprises a polyol to provide a ligand solution; (b) adding an iron precursor to the ligand solution to provide a reaction mixture; and (c) heating the reaction mixture under an for a period of time to provide iron oxide nanoparticles. In some embodiments, the heating of step (c) is performed under an inert atmosphere (e.g., in a nitrogen atmosphere or an argon atmosphere).

In some embodiments, the polyol is a diol. For example, in some embodiments, the diol is triethylene glycol (TREG) or another oligomer of ethylene glycol. The one or more polymeric organic ligands can be any suitable hydrophilic polymers. In some embodiments, the one or more polymeric organic ligands comprise or consist of PVP and/or PEI. If needed, the ligand solution can be heated (e.g., to about 80-100° C.) to aid in dissolving the ligands in the solvent.

The iron precursor can be any suitable iron coordination complex. In some embodiments, the iron precursor is iron (III) acetylacetonate. In some embodiments, the reaction mixture is heated to a temperature of about 170° C. to about 290° C. (e.g., about 170, 180, 190, 200, 210, 220, 230, 240, 250, 260, 270, 280, or about 290° C.). In some embodiments, the reaction mixture is heated to about 290° C. The period of time can be a few minutes to a few hours. In some embodiments, the period of time is about one hour.

In some embodiments, the ratio P:C of moles of iron precursor to total moles of polymeric organic ligand is about 30 or more. In some embodiments, P:C is about 30 to about 200. In some embodiments, P:C is about 30, about 50, about 75, about 100, about 125, about 150, about 175 or about 200. In some embodiments, the reaction mixture comprises about 0 moles to about 0.03 moles of PVP per mole of iron precursor and about 0 moles to about 0.01 moles of PEI per mole of iron precursor. Thus, in some embodiments, the reaction mixture is free of PVP. In some embodiments, the reaction mixture comprises about 0.001, 0.002, 0.003, 0.004, 0.005, 0.006, 0.007, 0.008, 0.009, 0.010, 0.015, 0.020, 0.025, or about 0.030 moles of PVP per mole of iron precursor. In some embodiments, the reaction mixture is free of PEI. In some embodiments, the reaction mixture comprises about 0.001, 0.002, 0.003, 0.004, 0.005, 0.006, 0.007, 0.008, 0.009, or about 0.01 moles of PEI per mole of iron precursor. In some embodiments, the reaction mixture is selected from the group comprising a reaction mixture comprising about 0.030 moles of PVP and about 0.0025 moles of PEI per mole of iron precursor; a reaction mixture comprising about 0.005 moles of PVP per mole of iron precursor; a reaction mixture comprising about 0.005 moles of PVP and about 0.00415 moles of PEI per mole of iron precursor; and a reaction mixture comprising about 0.005 moles of PEI per mole of iron precursor.

The NPs can be collected by any suitable method, e.g., filtration, precipitation, or centrifugation. In some embodiments, the NPs can be washed with water to remove any unreacted ligands. In some embodiments, the NPs can be dissolved in water or an aqueous solution.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Materials

All reagents were used as purchased. The reagents for NP synthesis included iron (III) acetylacetonate (Fe(acac)$_3$, 99%, Alfa Aesar), polyvinylpyrrolidone (PVP, $M_w$ 10 kDa, TCI America (Portland, Oregon, United States of America) or Thermo Fisher Scientific (Waltham, Massachusetts, United States of America)), polyethyleneimine (PEI, $M_w$ 60 kDa, 50% aq, Alfa Aesar, Haverhill, Massachusetts, United States of America), triethyleneglycol ($C_6H_{14}O_4$, TREG, 99%, Acros Organics, Fair Lawn, New Jersey, United States of America), and de-ionized water (DI, Thermo Fisher Scientific, Waltham, Massachusetts, United States of America). Potting soil, pots, and seeds of chickpea (*Cicer arientinum*), green gram or mung bean (*Vigna radiate*), black and red beans (*Phaseolus vulgaris*) were purchased from local grocery stores in Chattanooga, Tennessee, United States of America for plant growth experiments.

Example 1

Hematite NP Synthesis and Characterization

Hematite ($\alpha$-Fe$_2$O$_3$) NPs were synthesized using a highly reproducible modified polyol synthesis method that was previously reported [21,31]. Briefly, in a typical synthesis conducted on a Schlenk line, the Fe(acac)$_3$ iron precursor (2 mmol) was added to a PVP/PEI (PVP, 0.7 g (0.07 mmol) and PEI, 0.3 g (0.005 mmol)) ligand mixture in the solvent, TREG. The reactant mixture was heated at 290° C. for 1 h on a heating mantle with magnetic stirring under an inert atmosphere to form the hematite NP product. The NPs were cleaned with DI water three times via centrifugation at 14000 rpm. Transmission electron microscopy and x-ray diffraction characterization of these hematite NPs were previously reported [21].

Hematite NP Growth Dispersion Synthesis and Characterization:

The precipitant hematite NPs were dispersed in DI water via sonication (Branson 1800 (Branson Ultrasonic Corporation, Brookfield, Connecticut, United States of America), room temperature) for 15 minutes to obtain the target concentrations for use in subsequent plant growth studies. Two NP growth suspensions for plants were prepared with two different hematite NP concentrations, i.e., low NP concentration (0.022 $gL^{-1}$ Fe), and high concentration (1.1 $gL^{-1}$ Fe) NP, while DI water without addition of hematite NPs was used as a control.

Figure 1B:
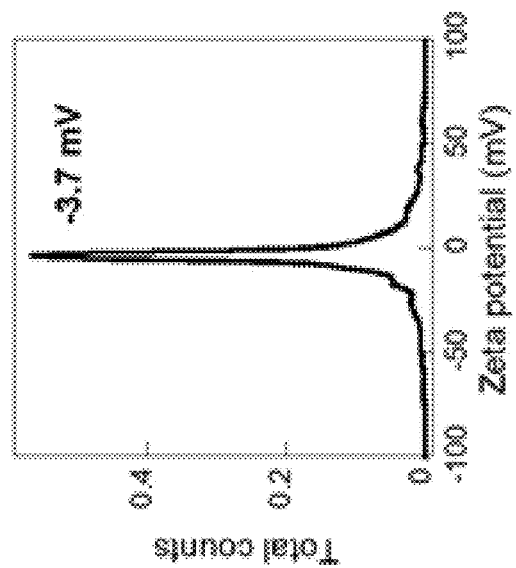
FIG. 1B is a zeta potential plot (total counts versus zeta potential (in millimvolts (mV)) of an exemplary hematite nanoparticle (NP) fertilizer of the presently disclosed subject matter.

The hydrodynamic diameter and zeta potential of the hematite NPs in the growth suspensions were analyzed on a Litesizer 500 Particle Analyzer (Anton Paar, Graz, Austria), prior to use as fertilizer drop for the legumes. See FIGS. 1A and 1B. Mean hydrodynamic diameter was reported based on an average of five consecutive runs. Zeta potential measurements were conducted at 25° C. using omega cuvettes and reported as an average of five analyses.

Example 2

Plant Growth Experiments Using Hematite NP Drop

Figure 3:
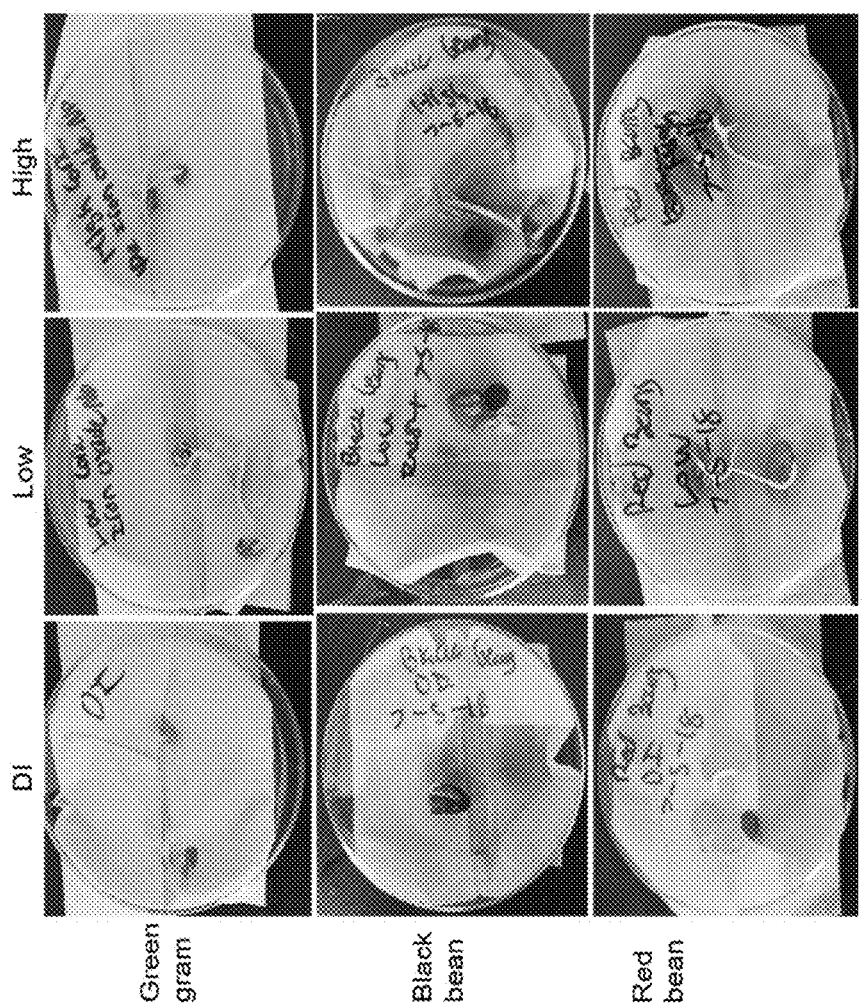
FIG. 3 is a series of photographic images of treated legume seeds (green gram, top row; black bean, middle row; and red bean, bottom row) immediately before planting. The seeds were treated with de-ionized water (DI, left-hand column), a drop of low concentration hematite nanoparticles (NPs) (Low, 0.022 grams per liter ($gL^{-1}$) iron (Fe), middle column), or a drop of high concentration hematite NPs (High, 1.1 $gL^{-1}$ Fe, right-hand column) via the modified seed pre-soak method of the presently disclosed subject matter.
Figure 2A:
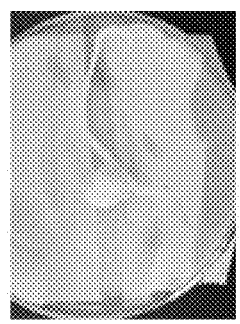
FIG. 2A is a photographic image of a chickpea seed treated with a drop of deionized (DI) water immediately before planting on day 7 post-treatment.
Figure 2B:
FIG. 2B is a photographic image of a chickpea seed treated with a drop of low concentration nanoparticle (NP) fertilizer suspension (0.022 grams per liter ($gL^{-1}$) iron (Fe) immediately before planting on day 7 post-treatment.
Figure 2C:
FIG. 2C is a photographic image of a chickpea seed treated with a drop of high concentration nanoparticle (NP) fertilizer suspension (1.1 grams per liter ($gL^{-1}$) iron (Fe)) immediately before planting on day 7 post-treatment.

Four different varieties of legumes i.e., chickpea or *Cicer arientinum*, green gram or *Vigna radiate*, black beans, and red beans or *Phaseolus vulgaris*, of varying seed sizes were used as test plants for plant growth studies to investigate the general effectiveness of the NP fertilizer. A "modified" seed pre-soak method was developed to enhance the growth of legumes using a drop of $\alpha$-$Fe_2O_3$ NP growth suspension. First, the seeds were cleaned with 75% ethanol and DI water and dried with filter paper for use in the plant growth experiments. In this modified pre-soak method, each legume seed was placed on a wet paper towel inside a sterilized petri dish (Thermo Fisher Scientific, Waltham, Massachusetts, United States of America), prior to the addition of one drop of $\alpha$-$Fe_2O_3$ NP growth suspension. A set of three petri dishes with the same seed type was prepared for adding three different growth suspensions i.e., one drop of DI water reference, one drop low concentration of hematite NPs (0.022 $gL^{-1}$ Fe), and one drop of high concentration of hematite NPs (1.1 $gL^{-1}$ Fe) to investigate the applicability of the NP fertilizer in enhancing plant growth. The petri dishes were then loosely closed with lids to retain airflow for the growing seeds. Roots were observed from these seeds within 2-4 days, following which the shoots sprouted. FIGS. 2A-2C show the three sets of seeds for chickpea immediately before planting. FIG. 3 shows green gram, black bean, and red bean seeds immediately before planting. A summary of the experimental parameters used for the plant growth study is presented in Table 1, below. Three seeds of the same legume species treated with DI water, low concentration NP drop, and high concentration NP drop were planted in the same pot as soon as shoots were seen around day 7. The pot was placed indoor near a window to ensure controlled environment and access to sunlight. The growth of each plant was subsequently monitored each day by measuring the length of the shoot using a Vernier caliper for a total period of 60-100 days, depending on the species. The experiment was repeated six times for each legume species to ensure statistical reliability. Error bars for the average plant height were reported based on a 95% student's t-distribution.

TABLE 1

Summary of key experimental conditions used to investigate legume growth with hematite NP fertilizer.

| Type of legume seeds Germination condition: Seeds placed in moist paper towel inside a nearly covered petri-dish | Type of suspension used for seed pre-soaking | No. of seeds test-ed | Potting conditions | Total time of plant growth monitoring (days) |
|---|---|---|---|---|
| Green gram Seed size: 4.76 ± 0.2 mm | Reference suspension: DI water (0 $gL^{-1}$ Fe), 1 drop | 6 | Soil Seeds potted after 7 days of germination Plant placed indoor in sunlight beside the window | 60 |
| | Low concentration suspension: Hematite NP fertilizer (0.022 $gL^{-1}$ Fe), 1 drop | 6 | Soil Seeds potted after 7 days of germination Plant placed indoor in sunlight beside the window | 60 |
| | High concentration suspension: Hematite NP fertilizer (1.1 $gL^{-1}$ Fe), 1 drop | 6 | Soil Seeds potted after 7 days of germination Plant placed indoor in sunlight beside the window | 60 |
| Black bean Seed size: 8.50 ± 0.7 mm | Reference suspension: DI water (0 $gL^{-1}$ Fe), 1 drop | 6 | Soil Seeds potted after 7 days of germination Plant placed indoor in sunlight beside the window | 60 |
| | Low concentration suspension: Hematite NP fertilizer (0.022 $gL^{-1}$ Fe), 1 drop | 6 | Soil Seeds potted after 7 days of germination Plant placed indoor in sunlight beside the window | 60 |
| | High concentration suspension: Hematite NP fertilizer (1.1 $gL^{-1}$ Fe), 1 drop | 6 | Soil Seeds potted after 7 days of germination Plant placed indoor in sunlight beside the window | 60 |
| Chickpea Seed size: 9.21 ± 0.7 mm | Reference suspension: DI water (0 $gL^{-1}$ Fe), 1 drop | 6 | Soil Seeds potted after 7 days of germination Plant placed indoor in sunlight beside the window | 100 |

TABLE 1-continued

Summary of key experimental conditions used to
investigate legume growth with hematite NP fertilizer.

| Type of legume seeds Germination condition: Seeds placed in moist paper towel inside a nearly covered petri-dish | Type of suspension used for seed pre-soaking | No. of seeds test-ed | Potting conditions | Total time of plant growth monitoring (days) |
|---|---|---|---|---|
| | Low concentration suspension: Hematite NP fertilizer (0.022 gL$^{-1}$ Fe), 1 drop | 6 | Soil Seeds potted after 7 days of germination Plant placed indoor in sunlight beside the window | 100 |
| | High concentration suspension: Hematite NP fertilizer (1.1 gL$^{-1}$ Fe), 1 drop | 6 | Soil Seeds potted after 7 days of germination Plant placed indoor in sunlight beside the window | 100 |
| Red bean Seed size: 16.82 ± 0.7 mm | Reference suspension: DI water (0 gL$^{-1}$ Fe), 1 drop | 6 | Soil Seeds potted after 7 days of germination Plant placed indoor in sunlight beside the window | 60 |
| | Low concentration suspension: Hematite NP fertilizer (0.022 gL$^{-1}$ Fe), 1 drop | 6 | Soil Seeds potted after 7 days of germination Plant placed indoor in sunlight beside the window | 60 |
| | High concentration suspension: Hematite NP fertilizer (1.1 gL$^{-1}$ Fe), 1 drop | 6 | Soil Seeds potted after 7 days of germination Plant placed indoor in sunlight beside the window | 60 |

The NP treated plants from all legume species except the chickpea produced fruit pods. Seeds were collected from the mature pods and cleaned with 75% ethanol and DI water. The seeds from NP treated green gram, black bean, and red bean plants were planted in pots of soil and placed near a window, similar to the first-generation plants. The second-generation seeds were planted on the same day after collection from the seed pods, without any NP treatment. The growth of the second-generation plants was then monitored to assess any adverse effect of the NP fertilizer on the next-generation of plants.

Example 3

Evaluating Plant Uptake of Hematite NPs

Fourier transform infrared spectroscopy: The surface functional groups of the shoot and leaf samples from legumes grown by seed pre-soaking with hematite NP drop were analyzed using a Bruker Alpha Fourier transform infrared (FTIR; Bruker Corporation, Billerica, United States of America) spectrometer equipped with attenuated total reflectance (ATR) capability to better understand the role of NP fertilizers in promoting plant growth. Samples for FTIR were prepared by cutting a 2 mm piece of the shoot and leaf from the potted plants after 10 days growth. FTIR measurements conducted over a range of 400-4000 cm$^{-1}$, were reported as an average of three consecutive measurements for reliability.

Hyperspectral imaging: The leaf samples from the legume plants as collected were further characterized via hyperspectral imaging using a hyperspectral microscope (CytoViva, Inc., Auburn, Alabama, United States of America) to investigate the accumulation of the NP fertilizer within the leaf. For hyperspectral imaging, the leaf samples were placed on a standard 1 mm glass slide and covered with a glass cover slip for viewing. The sample images were further analyzed by generating a spectral library from the images and filtering the library against respective images of hematite NPs and control leaf samples from plants grown without NP treatment to eliminate false positive signals. The remaining spectral library was then mapped to determine the location of NPs within the leaf samples.

ICP-OES measurements: Acid digestion of the plant leaves for ICP-OES analysis was carried out following an established protocol [32]. Leaves were collected from all the four species of potted plants after 10 days of growth, except for the green gram plant without NP treatment, because the plant did not survive that long. The leaves were air dried at 70° C. in an oven for 24 hours. Acid digestion was carried out with 100 mg of dried leaves for all the species. 5 mL of HNO$_3$ was added to 100 mg of each dried sample (from a specific plant type without or with NP treatment) in a glass vial and the mixture was left unaltered for 24 hours to allow the reaction to take place. The acidified sample was then heated at 120° C. on a hot plate for 1 hour. Four additions of 2 mL H$_2$O$_2$ were made after every 15 minutes within a 1 hour period. The digested sample turned colorless at the end of 1 hour and confirmed the completion of digestion process. The sample was then completely air dried in oven at 80° C. for 48 hours. The dried sample was cooled and dissolved in 3 mL of 10% HCl (v/v) for 2 hours. This solution was diluted five times with DI water and was used as the stock solution for the ICP-OES measurement.

An iCAP 6000 ICP-OES (Thermo Fisher Scientific, Waltham, Massachusetts, United States of America) was used to determine the iron content in the plant leaves. A high purity Argon (Ar) gas was employed as plasma, auxiliary (0.5 L/min) and nebulizing gas. Before operating with the sample, the ICP-OES was purged with Ar gas for 1 hour. The radio frequency (R.F.) power was kept at 1150 W. The sample pump rate was fixed at 50 rpm with stabilization time of 5 seconds. For iron content determination, the measurements were observed at most sensitive emission wavelength 259.9 nm. A standard calibration curve (1-5 ppm) for known iron concentration was prepared ($R^2$=0.999). The end solution from digestion step was used in ICP-OES to measure the unknown iron concentration by comparing its spectra with that from the calibration curve.

Example 4

Discussion of Examples 1-3

Figure 4:
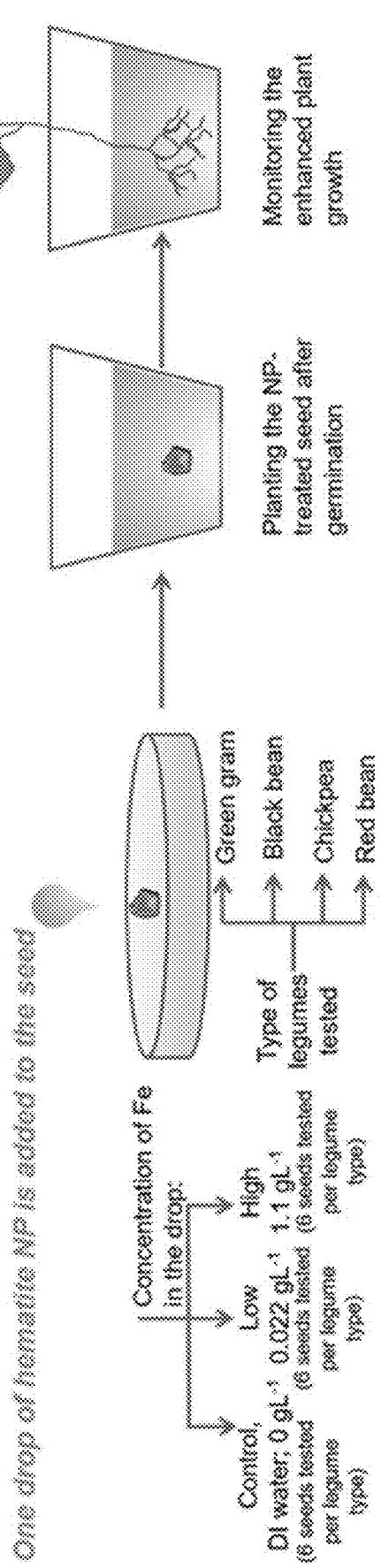
FIG. 4 is a schematic diagram showing the presently disclosed modified seed pre-soak method using hematite nanoparticle (NP) fertilizer according to a study described in the Examples performed in four legume species.

Iron is an essential element for the generation of chlorophyll in plants. Iron is added in the form of soil fertilizers or chelated compounds in soil-less cultivation to facilitate iron uptake for enhanced production of agricultural and bio-energy crops. Agricultural research facilities and commercial units are investigating innovative formulations of Fe fertilizers such as the Fe micronutrient containing iron and phosphates [33,34,35]. The two major targets in designing these fertilizers are to significantly increase the plant growth or production and to minimize the addition of excess fertilizers to the soil for environmental sustainability. As described in the Examples above, a "modified seed pre-soak" strategy was designed to apply the minimum possible quantity of Fe-fertilizer for enhanced plant growth. The seed was placed on a wet paper towel inside a nearly covered petri-dish for germination and one drop of the fertilizer suspension was added to the seed once, in this method. The germinated seeds were potted in soil after 7 days. Using this modified seed pre-soak method, the role of hematite NP fertilizer was investigated on the shoot growth of four different species of legumes (e.g., chickpea or *Cicer arientinum*, green gram or *Vigna radiate*, black beans, and red beans or *Phaseolus vulgaris*). Each species of legume seed was treated with a drop of hematite NP fertilizer suspension of three different concentrations: reference suspension (DI water, 0 $gL^{-1}$ Fe), low concentration (0.022 $gL^{-1}$ Fe), and high concentration (1.1 $gL^{-1}$ Fe). FIG. 4 shows a schematic representation of the improved seed pre-soak strategy used in this study to promote enhanced plant growth and production.

Figure 5A:
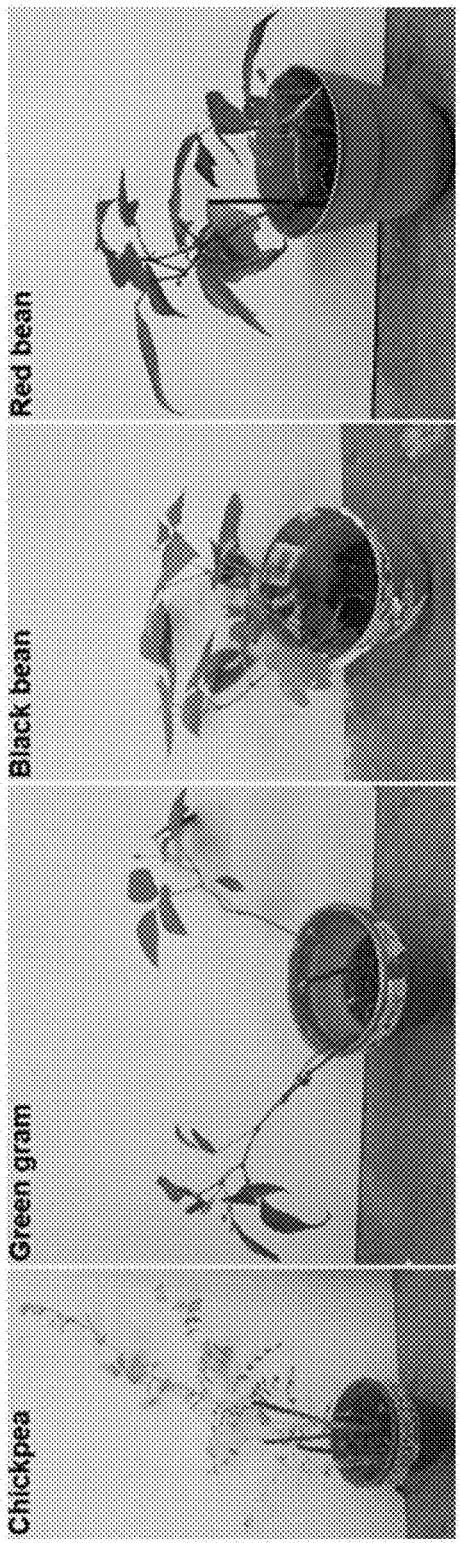
FIG. 5A is a series of photographic images showing the effect of the hematite nanoparticle (NP) fertilizer delivered via the presently disclosed modified seed pre-soak method on the growth of different legumes: chickpea (left), green gram (second from left), black bean (second from right), and red bean (right). The images are photographic images of the plants were taken on day 30 after transferring the seeds to potted soil.
Figure 5B:
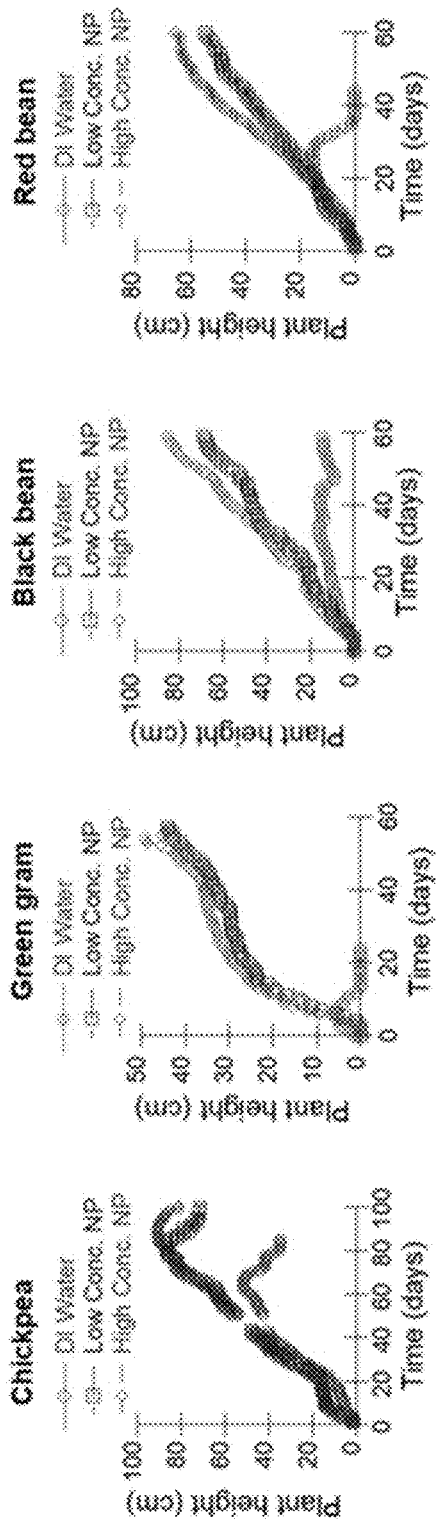
FIG. 5B is a series of graphs showing comparative time-dependent growth (plant height measured in centimeters (cm) versus time in days) of different legume species (chickpea, left; green gram, second from left; black bean, second from right; and red bean, right) treated with a drop of control DI water (circles), a drop of low concentration hematite nanoparticles (NPs) (squares), or a drop of high concentration hematite NPs (diamonds). Error bars on the plots are reported based on 95% normalized distribution.

The shoot length of each potted legume plant was measured every day for a maximum period of 100 days to determine the efficacy and concentration-dependent effect of the synthesized hematite NP fertilizer on plant growth enhancement. The growth experiments were repeated six times with new set of seeds for each legume species to predict statistically reliable growth trends. FIG. 5A shows representative images of different legume plants treated with different NP suspensions at the end of the growth study and FIG. 5B shows the corresponding time-dependent plant growth plots.

Figure 6:
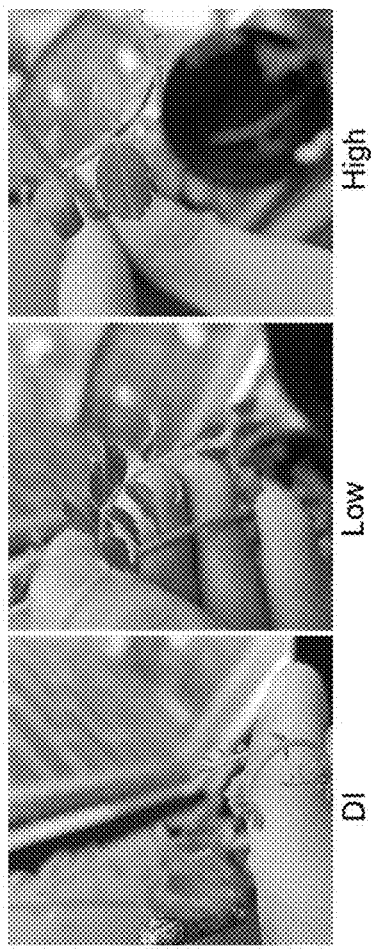
FIG. 6 is a series of photographic images showing the difference in leaf structure of chickpea plants grown from seeds pre-soaked with a drop of deionized water (DI, left), low concentration hematite nanoparticle (NP) fertilizer (middle), and high concentration of NP fertilizer (right).

As seen from the images, all three chickpea plants showed healthy growth, but the growth height of plants treated with a drop of high concentration hematite NP fertilizer was 230% higher than the control DI water plant. The chickpea plants treated with a drop of low concentration hematite NP fertilizer also grew 206% higher than the control DI water plant. Growth heights were reported based on the final height of the plant achieved before the plant death. In addition, the NP fertilizer treated chickpea plants showed a higher survival time than the control DI water plants by 15 days. The DI water chickpea plant held an increasing growth trend for 72% of its total life span. In comparison, the hematite NP treated plants showed an increasing growth for 82-85% of their life span, suggesting a healthier growth and vitality as compared to the DI water plant. A difference in morphology of the leaves for chickpea plants treated with DI water, low concentration NP fertilizer, and high concentration NP fertilizer was observed. See FIG. 6. Without being bound to any one theory, this suggests a possible dominance of a more stable genetic structure for the NP treated plants [10,36]. Further detailed investigation on the plant leaves and genetic and molecular level analyses can be performed to shed additional light on this aspect.

The Fe-enriching hematite NP fertilizer significantly boosted the growth of green gram plants as the seeds treated with low and high concentrations of the fertilizer grew 830% and 700% more than the control DI water plant. The NP fertilizer treated green gram plants were stronger with a 5-fold higher survival span compared to the control plant. These green gram plants produced pods after 18 days, two times faster than other literature reports on regular plants [37].

Figure 7:
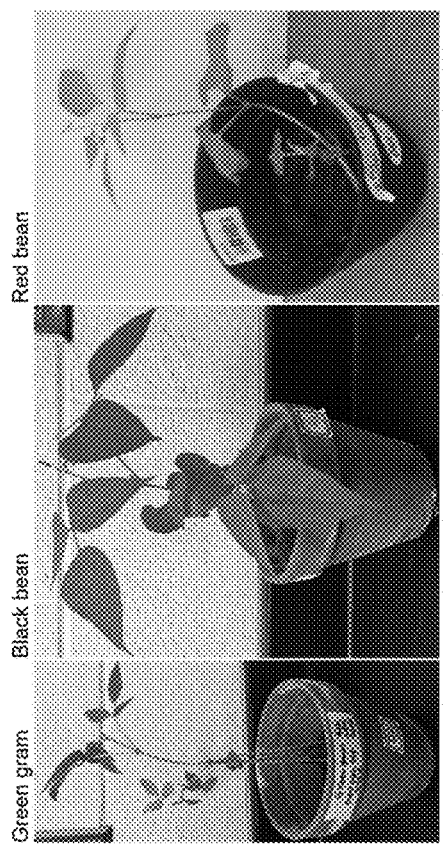
FIG. 7 is a series of photographic images showing healthy second-generation plants (green gram, left; black bean, middle; and red bean, right) from plants grown from seeds treated with a drop of hematite nanoparticle (NP) fertilizer of the presently disclosed subject matter. The images were taken after 20 days of planting in the potted soil.

In the case of black beans, the plants grown with a drop of high concentration hematite NP fertilizer showed the highest growth. The Fe-enriching hematite NP fertilizer significantly boosted the growth rate of black bean plants, even though beans are richer in Fe content compared to the other legume species tested in this study [38]. Black bean plants treated with high and low concentration NP fertilizer grew 588% and 453% higher than the control plants, respectively. Growth percentages were reported based on the last day of measurement for the black bean plants. They also produced more seed pods than the control plants and healthy second-generation plants were observed for the NP treated black bean [39]. See FIG. 7. However, the survival span of black bean plants was not affected by the NP fertilizer. Without being bound to any one theory, this could be due to the high iron content in beans [38].

The Fe-enriching NP fertilizer treatment increased the growth of red bean plants by 425% and 350% for high and low fertilizer concentrations, respectively as compared to the control plant. Fruit production per plant increased two-fold with NP treatment for the red bean plants and healthy second-generation plants were observed. See FIG. 7.

In brief, particular insights from the present growth studies include that the presently disclosed modified seed pre-soak method with hematite NP fertilizer increased the growth of legumes by 230-830%, increased survival time of most legume species, enhanced fruit production per plant except for chickpeas, facilitated faster fruit production, and resulted in healthy second generation plants. The highest impact in growth with the NPs was observed for the green gram plants.

Figure 8C:
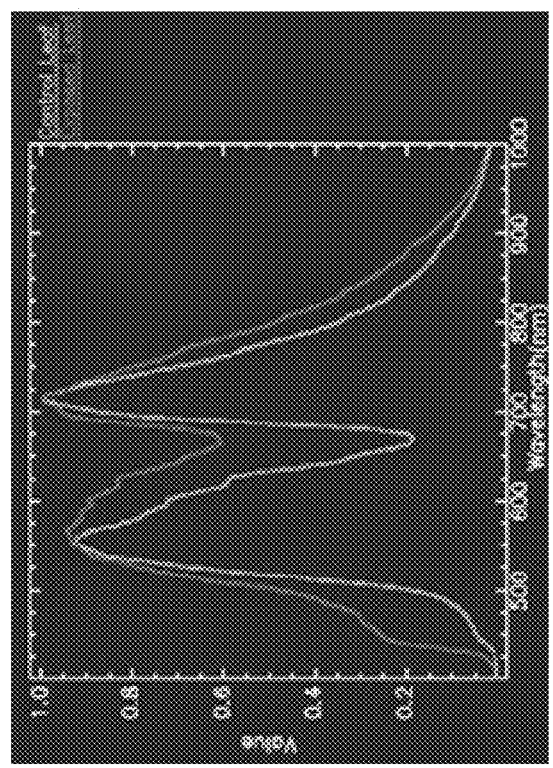
FIG. 8C is a graph showing the comparative spectral plots (value versus wavelength (in nanometers (nm)) of leaves from the control plant described for FIG. 8A (green) and the nanoparticle-treated plant described for FIG. 8B (red).
Figure 8B:
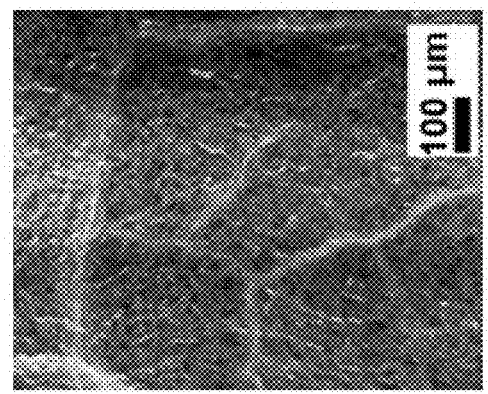
FIG. 8B is a hyperspectral image of a black bean leaf sample from a plant grown from a seed pre-treated with a drop of high concentration hematite nanoparticles (NPs, 1.1 grams per liter ($gL^{1}$) iron (Fe)). The red dots indicate localization of NPs. The error bar in the lower right corner represents 100 micrometers (μm).
Figure 8A:
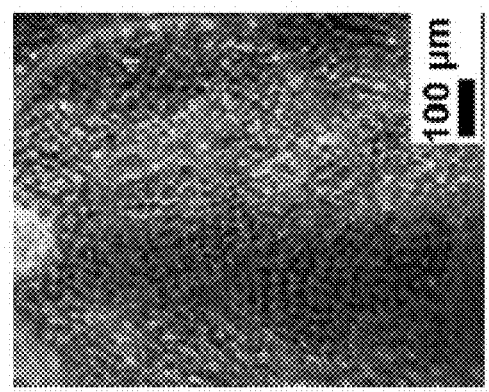
FIG. 8A is a hyperspectral image of a black bean leaf sample from a plant grown from a seed pre-treated with a drop of deionized (DI) water. The error bar in the lower right corner represents 100 micrometers (μm).
Figure 9A:
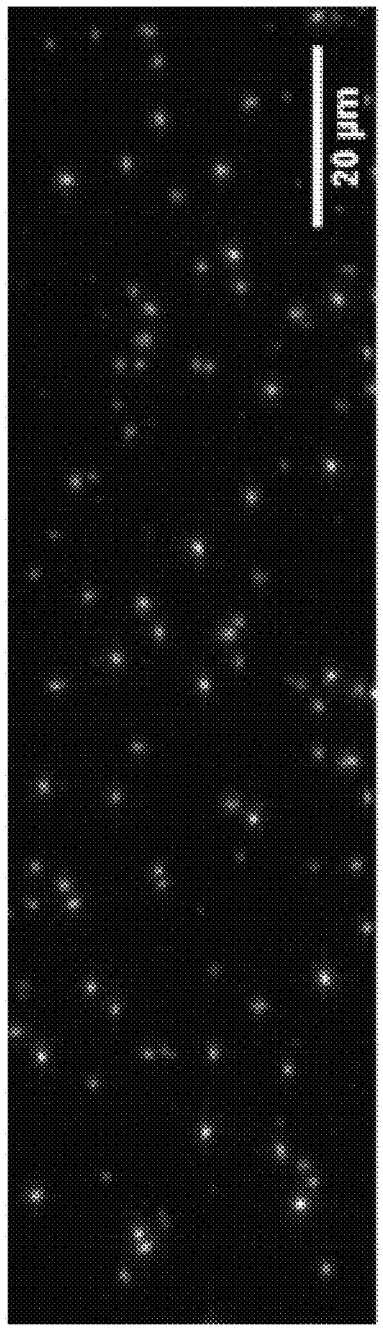
FIG. 9A is a hyperspectral image of a hematite nanoparticle (NP) fertilizer of the presently disclosed subject matter. The scale bar in the lower right corner represents 20 micrometers (μm).
Figure 9C:
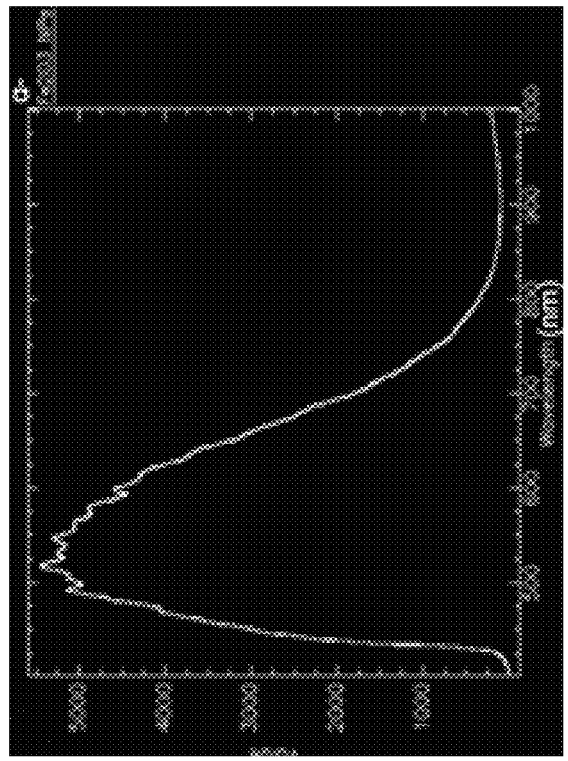
FIG. 9C is a spectral plot (value versus wavelength (in nanometers (nm)) of the hematite nanoparticle fertilizer shown in FIGS. 9A and 9B.
Figure 9B:
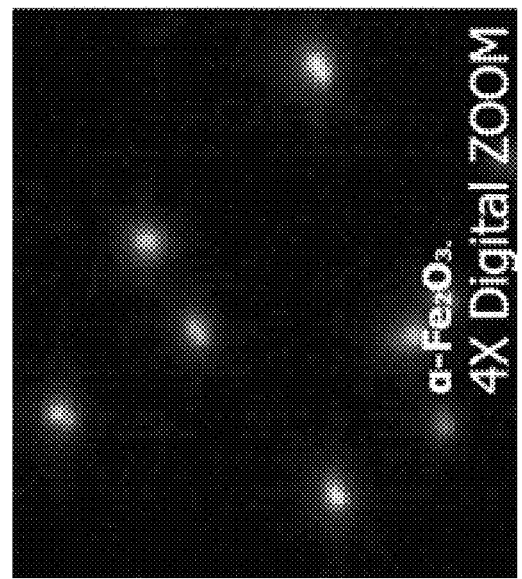
FIG. 9B is a four-times magnified hyperspectral image of the hematite nanoparticle (NP) fertilizer shown in FIG. 9A.
Figures 10A, 10B:
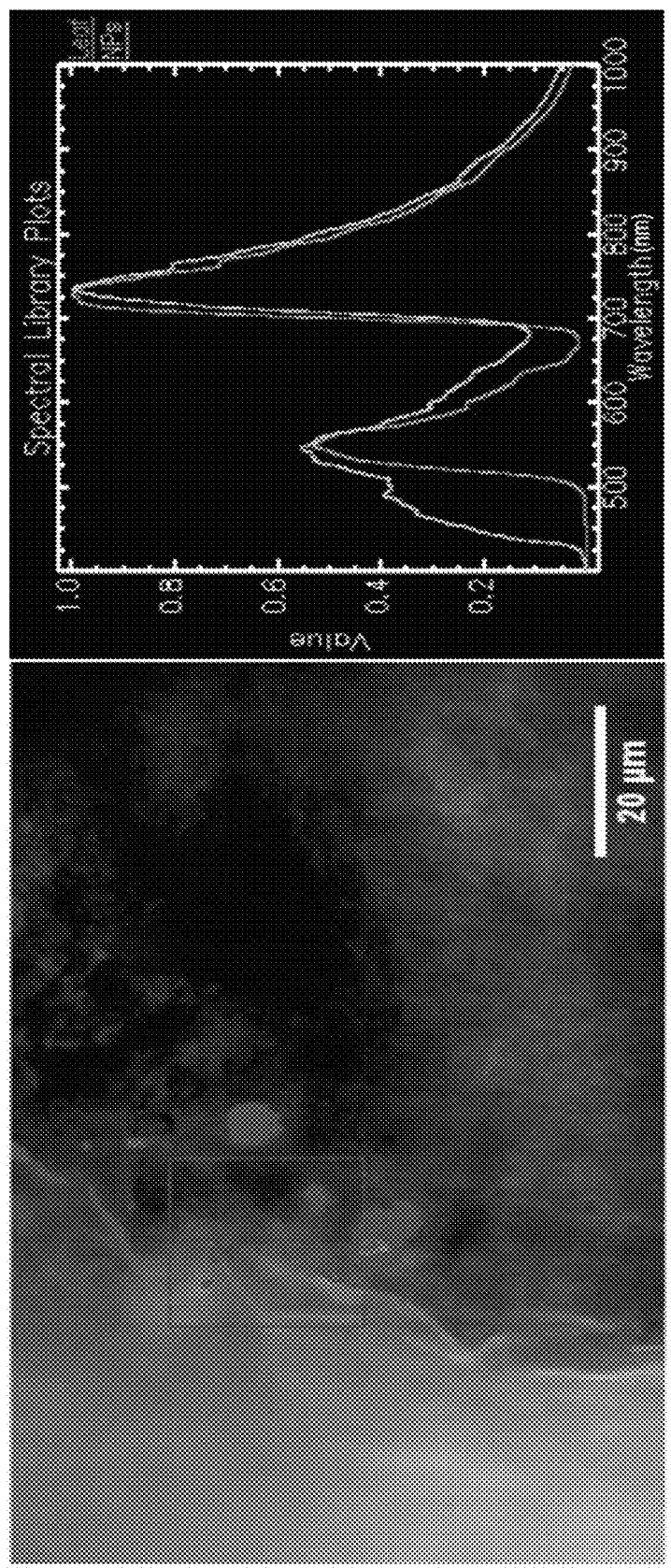
FIG. 10A is a hyperspectral mapping image showing localization of hematite nanoparticles (NPs) within a chickpea leaf from a chickpea plant grown from a seed pre-treated with a drop of hematite NP fertilizer according to the presently disclosed subject matter. The scale bar in the lower right corner represents 20 micrometers (μm)
FIG. 10B is a spectral plot (value versus wavelength (in nanometers (nm)) of the leaf shown in FIG. 10A. The plot of a control leaf is in green and the plot of the nanoparticle treated leaf in grey.

The present results indicate the potential of hematite NPs to serve as a Fe-enriching fertilizer for enhanced agricultural production. However, understanding the method of uptake and interaction of these NPs with the plants can be helpful with regard to practical applicability and safety. It can be difficult to determine NP interactions in complex biological media like plants via a single independent material characterization technique due to the low concentrations of NPs encountered in the plant tissues, interference from plant tissues, and the similarity of the NPs to naturally occurring NPs or metal ions. Electron microscopy is traditionally used to visualize NPs within the plants, but the sample preparation required for this method increases the probability of artifacts in the images. Therefore, hyperspectral imaging, a minimally invasive and enhanced darkfield imaging technique requiring negligible sample preparation was selected to investigate the uptake of hematite NPs in the legumes [29,40]. The enhanced darkfield illumination technology in this method minimized light loss and enabled scatter from sample to be detected without source illumination interference. FIGS. 8A and 8B show representative hyperspectral images of control and NP-treated black bean leaves used for visually mapping the localization of hematite NP fertilizer. The spectral signature of the NP fertilizer was collected as a reference for comparison. A spectral library was created from the image of the NP-treated leaf and filtered against the control image to generate the comparative map. See FIG. 8C. The peak around 475 nm and the shoulder at 600-650 nm indicated the presence of hematite NPs in the leaves of legumes treated with the NP fertilizer. The localization of hematite NPs within the leaf is marked in red in FIG. 8B. The images and spectra from chickpea leaves and the raw hematite NP fertilizer further confirm this conclusion. See FIGS. 9A-9C, 10A and 10B. It should be noted that although hyperspectral imaging has been reported earlier in detecting NPs within animal tissues, use of this technique for plant samples is relatively new [29].

Figure 1C:
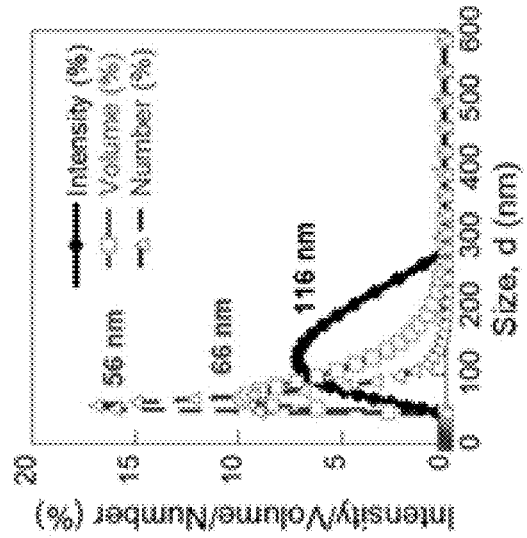
FIG. 1C is a Fourier transform infrared (FTIR) spectrum (transmittance measured as a percentage (%) versus wavelength measured in inverse centimeters ($cm^{-1}$)) of an exemplary hematite nanoparticle (NP) fertilizer of the presently disclosed subject matter.
Figure 11B:
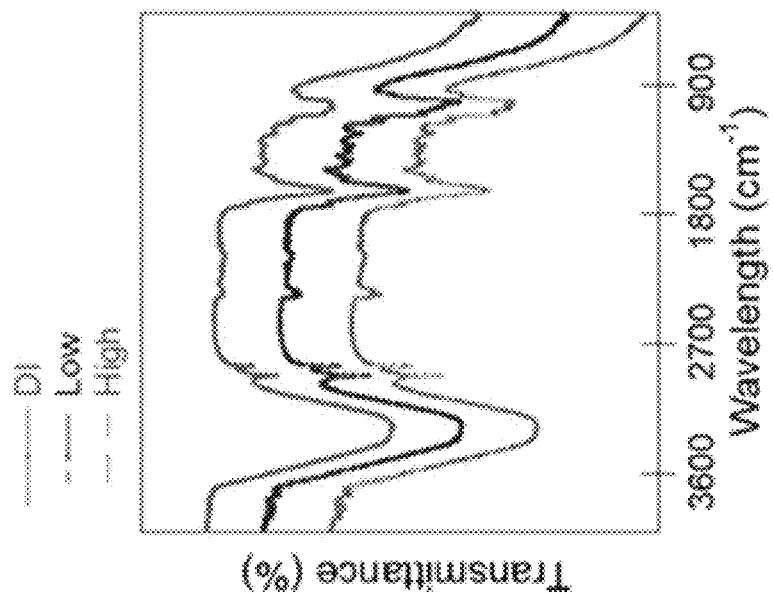
FIG. 11B is a graph showing the Fourier transform infrared (FTIR) spectra (transmittance (in percentage (%)) versus wavelength (inverse centimeters ($cm^{-1}$))) of red bean leaf samples from red bean plants grown from seeds treated with a drop of deionized (DI) water, a drop of hematite nanoparticles (NPs) at a low concentration, or a drop of hematite NPs at a high concentration. Samples were taken after 10 days of growth in soil.
Figure 11A:
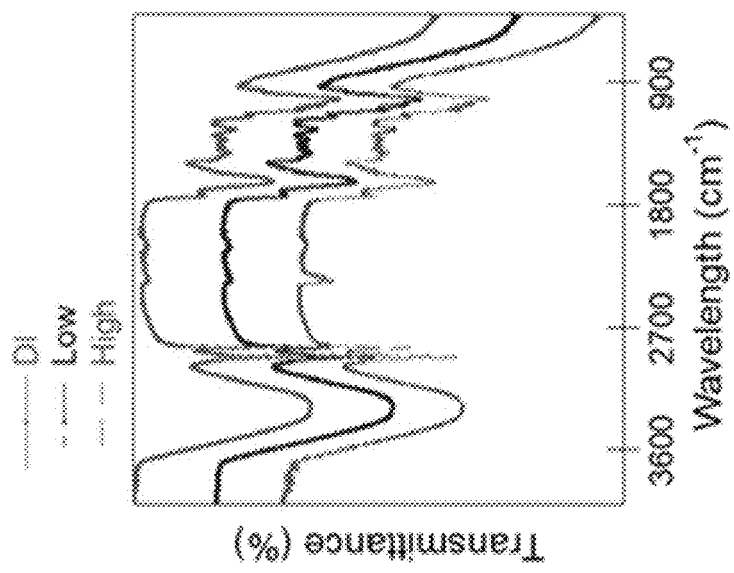
FIG. 11A is a graph showing the Fourier transform infrared (FTIR) spectra (transmittance (in percentage (%)) versus wavelength (inverse centimeters ($cm^{-1}$))) of red bean stem samples from red bean plants grown from seeds treated with a drop of deionized (DI) water, a drop of hematite nanoparticles (NPs) at a low concentration, or a drop of hematite NPs at a high concentration. Samples were taken after 10 days of growth in soil.
Figure 12:
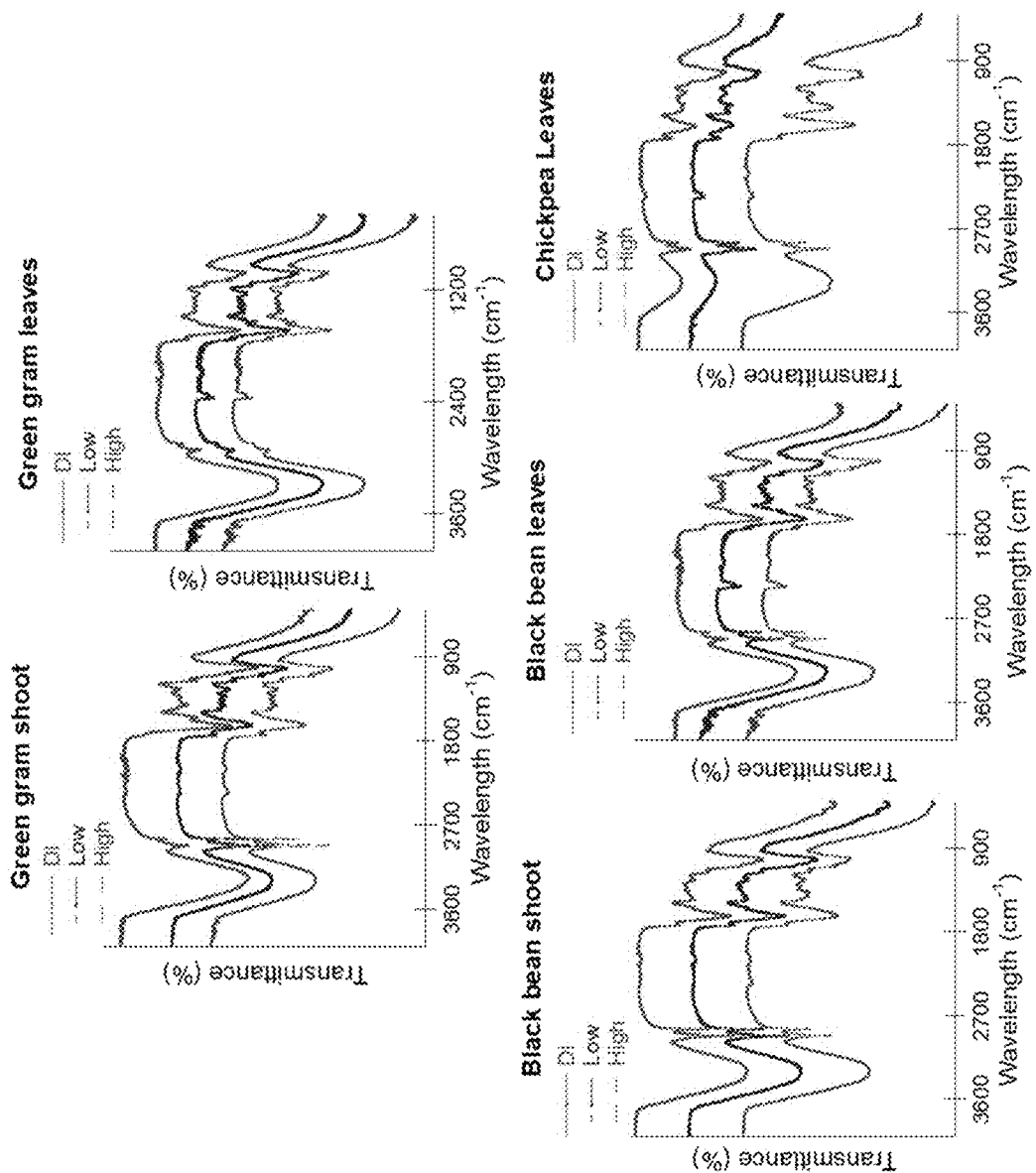
FIG. 12 is a series of graphs showing the Fourier transform infrared (FTIR) spectra (transmittance (in percentage (%)) versus wavelength (inverse centimeters ($cm^{-1}$))) of green gram shoot samples (top left), green gram leaf samples (top right), black bean shoot samples (bottom left), black bean leaf samples (bottom middle) and chickpea leaf samples (bottom right) from plants grown from seeds treated with a drop of deionized (DI) water, a drop of hematite nanoparticles (NPs) at a low concentration, or a drop of hematite NPs at a high concentration.

FTIR with ATR was used as a second non-invasive characterization technique requiring minimum sample preparation to further understand the uptake and translocation of the NP fertilizer within the legumes [16,21]. The chemical composition of the shoot and leaves of the legumes grown from seeds pre-soaked in DI water, low concentration NP fertilizer, and high concentration NP fertilizer were investigated using an FTIR spectrometer. FIGS. 11A and 11B shows the representative FTIR plots from red bean shoots and leaves after 10 days of plant growth. Typically, the shoot and leaf exhibit characteristic peaks between 3500-3000 $cm^{-1}$ representative of O—H and N—H groups, 3000-2800 $cm^{-1}$ due to $CH_3$ and $CH_2$ stretching, 1800-1200 $cm^{-1}$ attributed to C=O stretch, 1738 $cm^{-1}$ attributed to membrane lipids and cell wall, 1656 $cm^{-1}$ due to amide I, 1563 $cm^{-1}$ from amide II, 1513 $cm^{-1}$ attributed to lignin, 1235-1153 $cm^{-1}$ due to carbonyl stretch in esters and amide III, and 1100-1000 $cm^{-1}$ in the fingerprint region owing to cellulose [21,41]. All these regions were visible in the FTIR spectra of all shoot and leaf samples. The shoot of red bean plants treated with high concentration hematite NP fertilizer showed additional bands at 2345 and 2365 $cm^{-1}$, similar to the C—N triple bond peaks in the FTIR spectrum of hematite NPs. See FIG. 1C. This data suggests internalization of the NP fertilizer by the plants treated with high concentrations of the fertilizer. The peaks at 2345 and 2365 $cm^{-1}$ were absent in the shoot samples of both the low concentration and DI water plants, indicating absence of NPs in the stem of these plants after 10 days growth. However, the leaves of both low and high concentration NP treated plants showed these two additional peaks. This suggests the translocation of the NP fertilizer from the roots through the stem to the leaves. The NP fertilizer localized in the leaves within 10 days of growth in the low concentration NP treated plants. After 10 days of growth, the hematite NPs were being transported through the shoot with some accumulation within the leaves for the plants treated with high concentration of NPs. See FIG. 12. Therefore, the coupled hyperspectral imaging and FTIR characterization method provided significant insights on the transport of the NP fertilizer through the legume plants. Without being bound to any one theory, the difference in the rate of transport of the NPs within the plants could account for the enhanced growth rate in the NP treated plants, based on the FTIR results.

Figure 13:
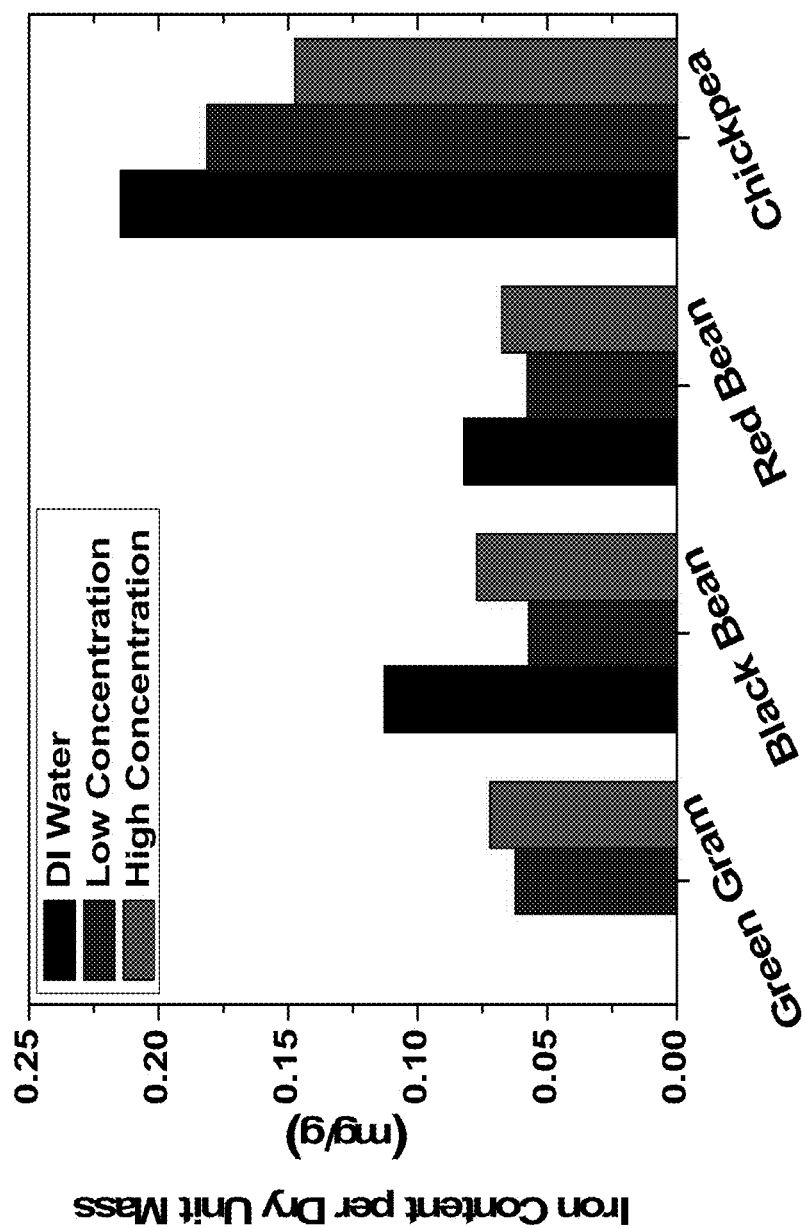
FIG. 13 is a graph showing iron content (milligrams per gram (mg/g) dry weight) in four different legume (green gram, black bean, red bean and chickpea) plants grown from seeds pre-treated with a drop of hematite nanoparticle fertilizer at two different iron concentrations. For comparison, iron content in a plant grown from a seed pre-treated with a drop of deionized (DI) water is also shown.

The ICP-OES measurements confirmed the presence of iron in the plant leaves but indicated the absence of any dose-dependent relationship between the iron content in plant leaves and hematite NP dosing. See FIG. 13. The results did not suggest any significant difference in the iron content among the three different dose conditions (control, low concentration NP, and high concentration NP) for each species of legumes. Previous studies involving iron NP in the soil matrix after seed germination have reported dose-dependent relationship between the iron NP dosage and iron content within different parts of the plant [10,16, 42]. However, when applied as only seed treatment, Srivastava et al. found no significant difference in iron content in spinach plant leaves with different iron pyrite ($FeS_2$) NP dosing [12, 43]. The present study also confirms the absence of a significant dose dependent iron content relationship when applying NPs in the presently disclosed "modified seed pre-soak" strategy. Without being bound to any one theory, hematite NP facilitating enzymatic activity during germination, through surface chemistry rather than uptake, can be attributed as one of the reasons. These surface mediated processes can contribute to the overall growth of the plants. Additionally, plants dosed with higher hematite NP loading exhibited higher and faster growth resulting in more chlorophyll production utilizing more iron content. This can also offset the added iron input for plants with NP dosing compared to the controls.

In summary, the presently disclosed subject matter provides a seed pre-soak method using just a drop of hematite NP fertilizer to significantly increase plant growth in legumes by 230-830%, depending on the species. Though the growth trend varied between different species of legumes, in general, the seeds treated with high concentration of the NPs (1.1 $gL^{-1}$ Fe) showed the fastest growth compared to those soaked in low concentration of the NPs (0.022 $gL^{-1}$ Fe) and control DI water. The NP treated plants exhibited two-fold faster initial fruit production, two-times more fruits per plant, and longer life span compared to the control plants, in general. They also produced healthy second-generation plants.

The presently disclosed subject matter further provides a minimally invasive material characterization strategy coupling hyperspectral imaging and FTIR to determine the internalization and transport of the NP fertilizer within the plants, while minimizing artifacts from sample preparation. The hematite NPs were transported through the shoot and localized in the leaves of the legumes. The ICP-OES measurements showed the presence of iron in the plant leaves, however, no correlation was found between the iron content in the leaves and input hematite NP fertilizer concentrations. This indicates that seed pre-soaking with hematite NPs led to more effective iron utilization, which resulted in improved growth and faster fruit productions in the tested plants.

One advantage of the presently disclosed method is that the NP fertilizer was added in minimum quantity to a moist paper towel as a pre-soak solution for the seed. No NPs or additional ingredients were added to the soil. Therefore, the Fe-enriching NP fertilizer can significantly increase the production rate and life span of plants with minimum impact on the environment. The hematite NP fertilizer and the reported strategy can be highly beneficial, for example, in enhancing production of bio-energy crops.

Example 5

Size-Controlled Hematite NPs

A family of size-controlled hematite nanoparticles (NPs) were synthesized using different ligand coatings of polyvinyl pyrrolidone (PVP) and polyethyleneimine (PEI). The type of ligand binding on the surface can alter the inherent properties of the NP such as size, shape, and water solubility. For example, a stronger binding ligand such as oleic acid has been known to induce smaller particle sizes in magnetite NPs. In this example, four new types of hematite NP formulations were synthesized using the specific ligand mixtures of 0.06 mmol PVP/0.005 mmol PEI, 0.01 mmol PVP, 0.01 mmol PVP/0.0083 mmol PEI, and 0.01 mmol PEI in the modified polyol wet-chemical synthesis. These new types of hematite NPs were synthesized via a modified polyol technique, similar to the previously described procedure [21].

Hematite NP Synthesis: The following chemicals were used as purchased for the synthesis: iron (III) acetylacetonate ($Fe(acac)_3$, 99%, Alfa Aesar, Haverhill, Massachusetts, United States of America), polyvinylpyrrolidone (PVP, $M_w$ 10 kDa, TCI America (Portland, Oregon, United States of America) or Thermo Fisher Scientific (Waltham, Massachusetts, United States of America)), polyethyleneimine (PEI, $M_w$ 60 kDa, 50% aq, Alfa Aesar, Haverhill, Massachusetts, United States of America), triethyleneglycol ($C_6H_{14}O_4$, TREG, 99%, Acros Organics, Fair Lawn, New Jersey, United States of America), and de-ionized water (DI, Thermo Fisher Scientific, Waltham, Massachusetts, United States of America).

The synthesis was conducted in a Schlenk line using a heating stirring mantle under an inert atmosphere. In a typical synthesis of hematite NPs, the respective ligand mixture (e.g., 0.06 mmol PVP/0.005 mmol PEI, 0.01 mmol PVP, 0.01 mmol PVP/0.0083 mmol PEI, and 0.01 mmol PEI) was heated to dissolution at 90° C. in the solvent, TREG. The iron precursor, $Fe(acac)_3$ (2 mmol) was then added to the reactant mixture and the reactants were heated at 290° C. for 1 h under a N2 atmosphere to form the hematite NPs. The NPs were washed in DI water three times via centrifugation at 14000 rpm (Branson 1800, Branson Ultrasonic Corporation, Brookfield, Connecticut, United States of America) to remove any unreacted ligands. The final hematite NP products were dissolved in DI water to form the nanofertilizer stock solutions.

Figure 14A:
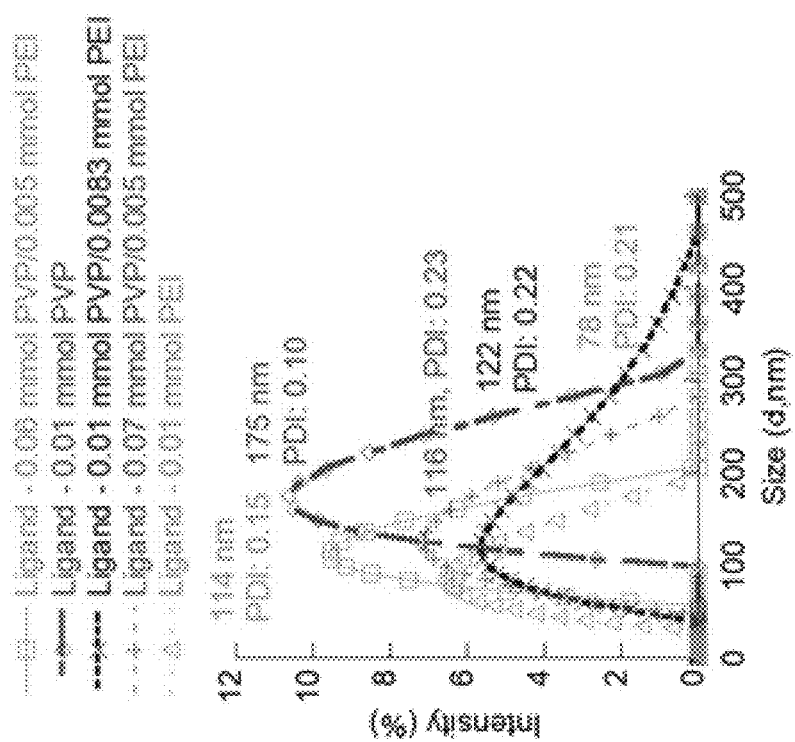
FIG. 14A is a graph showing the hydrodynamic diameters (in nanometers, nm) of different hematite nanoparticle (NP) formulations measured using dynamic light scattering (DLS). The hematite NP formulations include those prepared from reaction mixtures comprising the following ligand or ligand mixtures: 0.06 millimoles (mmol) polyvinylpyrrolidone (PVP)/0.005 mmol polyethyleneimine (PEI), squares; 0.01 mmol PVP, circles; 0.01 mmol PVP/0.0083 mmol PEI, "x"s; 0.07 mmol PVP/0.005 mmol PEI, "+" s; and 0.01 mmol PEI, triangles.
Figure 14B:
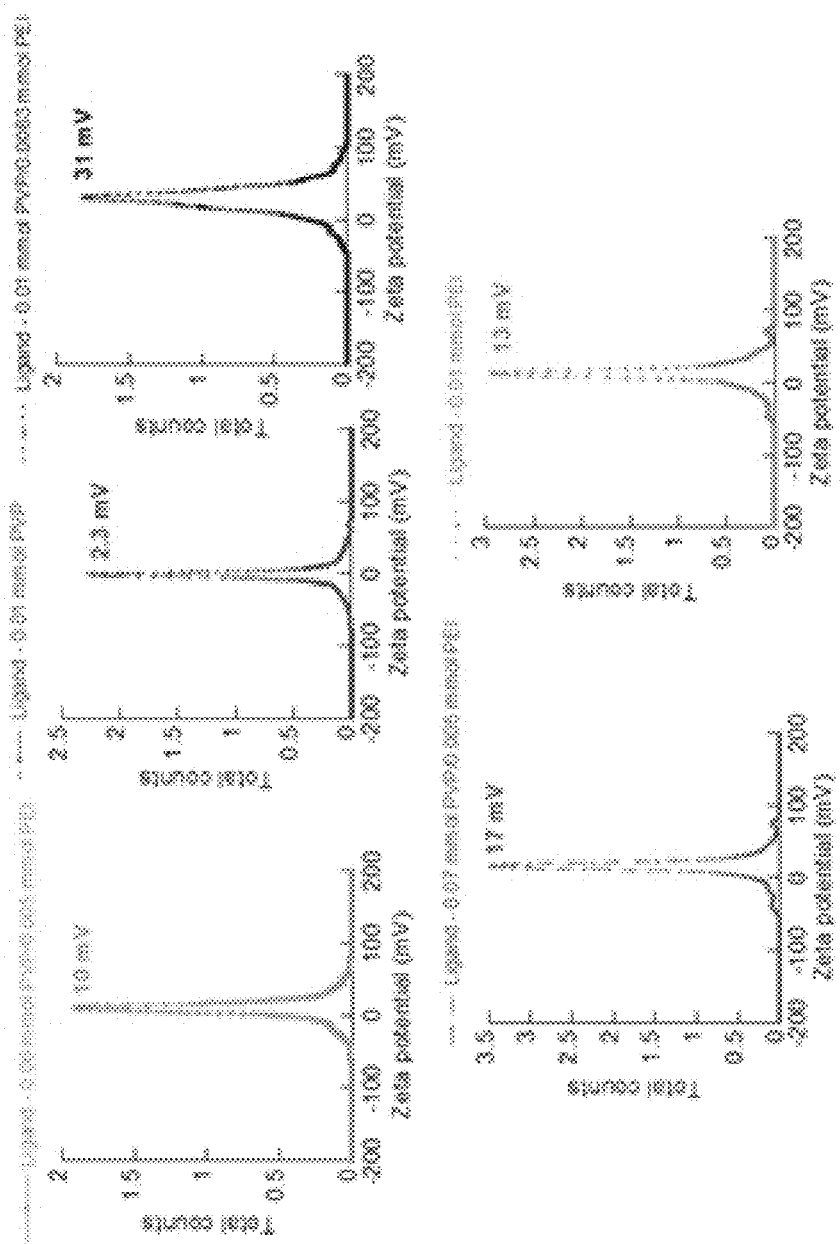
FIG. 14B is a series of zeta potential plots (total counts versus zeta potential (in millivolts (mV))) for hematite nanoparticle (NP) formulations prepared from reaction mixtures comprising the following ligands or ligand mixtures: 0.06 millimoles (mmol) polyvinylpyrrolidone (PVP)/0.005 mmol polyethyleneimine (PEI), top left; 0.01 mmol PVP, top middle; 0.01 mmol PVP/0.0083 mmol PEI, top right; 0.07 mmol PVP/0.005 mmol PEI, bottom left; and 0.01 mmol PEI, bottom right.
Figure 15B:
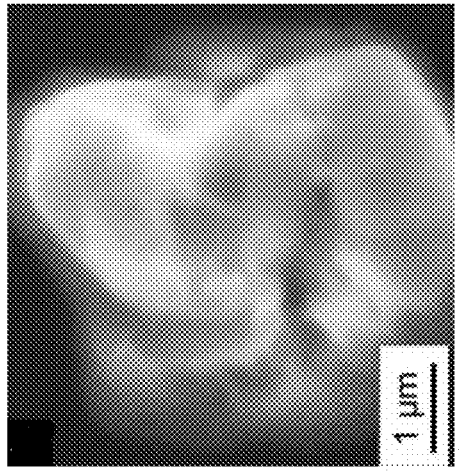
FIG. 15B is a scanning electron microscopy (SEM) image of an aggregate of 0.01 millimole (mmol) polyethyleneimine (PEI)-coated hematite nanoparticles. The scale bar in the lower left corner represents 1 micrometer (μm).
Figure 15A:
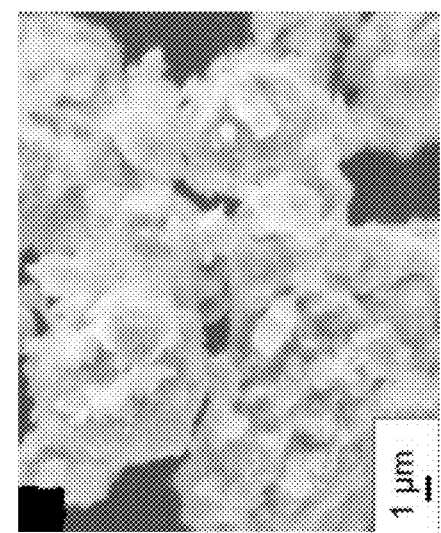
FIG. 15A is a scanning electron microscopy (SEM) image of an aggregate of 0.01 millimole (mmol) polyethyleneimine (PEI)-coated hematite nanoparticles. The scale bar in the lower left corner represents 1 micrometer (μm).
Figure 15C:
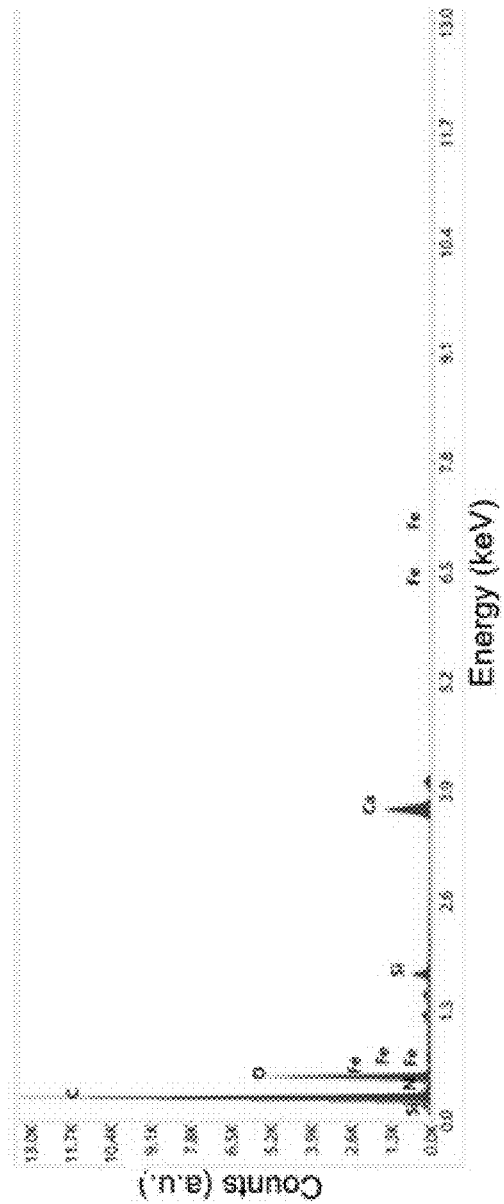
FIG. 15C is an energy dispersive x-ray (EDX) plot (counts (arbitrary units (a.u.)) versus energy in kiloelectronvolts (keV)) of the aggregate of 0.01 millimole (mmol) polyethyleneimine (PEI)-coated hematite nanoparticles shown in FIGS. 15A and 15B.

Size and surface charge of the new hematite NP formulations were significantly different due to their ligand coatings, as seen from the dynamic light scattering (DLS) size and zeta potential measurements. See FIGS. 14A and 14B. The measurements were conducted on a Litesizer 500 Particle Analyzer (Anton Paar, Graz, Austria). Zeta potential was measured at room temperature using Omega cuvettes. All size and zeta potential results were reported as an average of three consecutive runs. The nanoparticles were also characterized on a S3400N Hitachi scanning electron microscope (SEM; Hitachi High-Tech, Tokyo, Japan) equipped with an EDAX energy dispersive x-ray (EDX) unit for surface and size analysis. FIGS. 15A-15C show representative SEM images and an EDX plot of 0.01 mmol PEI-coated iron oxide nanoparticle fertilizer. The EDX analysis gives the chemical composition of the nanofertilizer. Peaks of Fe and O are clearly visible in the EDX characterization of the hematite nanofertilizer. See FIG. 15C. The C and Ca peaks are due to the carbon tape used to load the sample on the SEM stub while the Si peak comes from the SEM holder.

Figure 16:
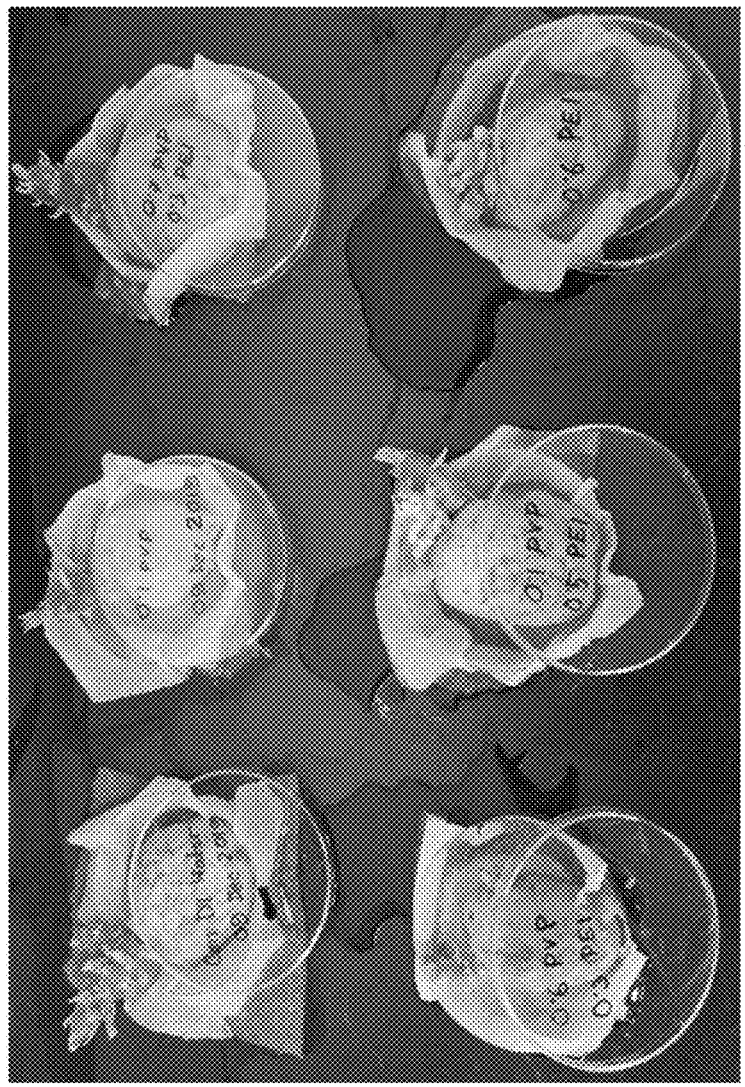
FIG. 16 is a photographic image of potato slices pre-soaked with one drop of one of several different hematite nanoparticle formulations where the different hematite nanoparticle formulations were prepared from reaction mixtures with the following ligands or ligand mixtures: 0.01 millimole (mmol) polyvinylpyrrolidone (PVP) (top middle), 0.07 mmol PVP/0.03 mmol polyethyleneimine (PEI) (top right); 0.06 mmol PVP/0.0083 mmol PEI (bottom left); 0.01 mmol PVP/0.005 mmol PEI (bottom middle), or 0.06 mmol PEI (bottom right). For comparison, a potato grown from a seed pre-treated with a drop of deionized water is shown in the top left.
Figure 17:
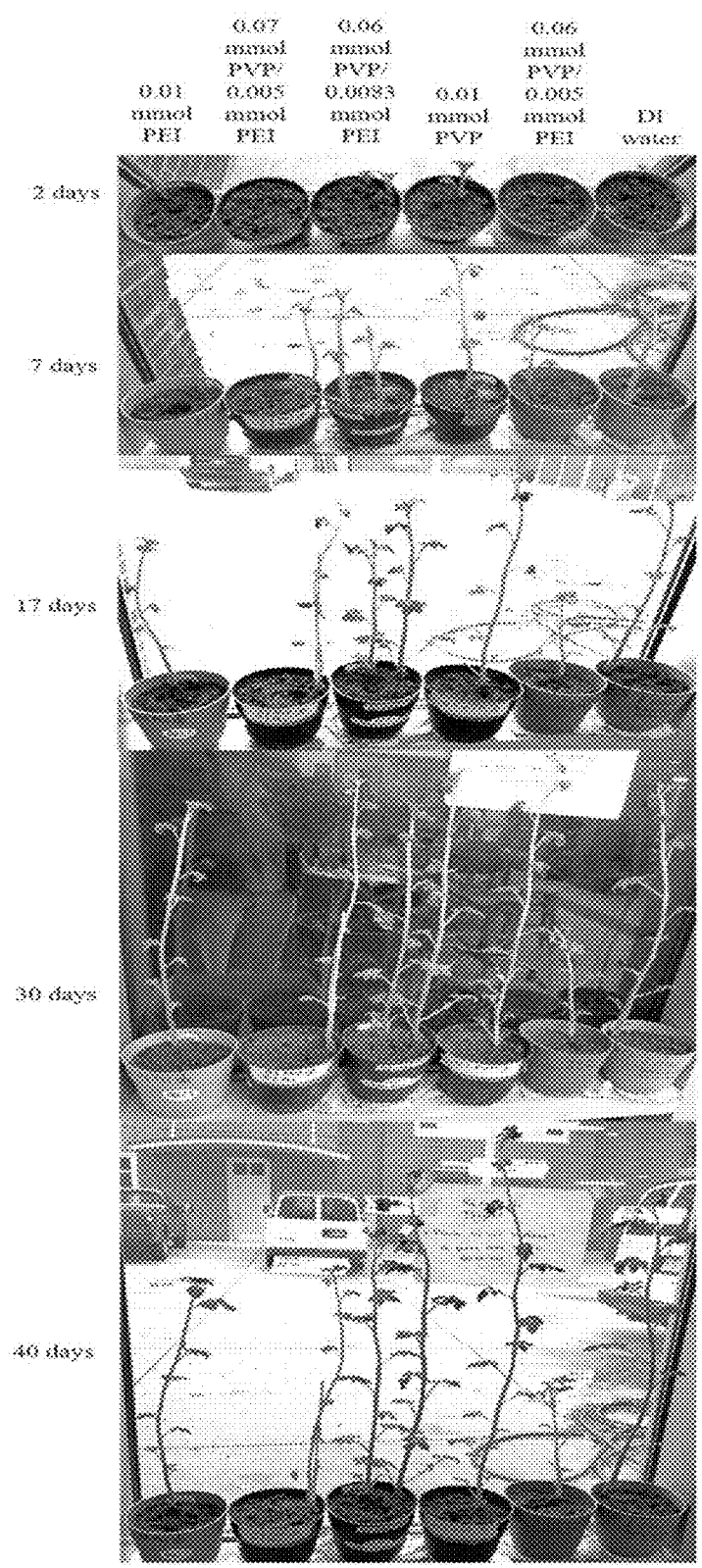
FIG. 17 is a series of photographic images showing the growth of potato plants grown for two days (top row), seven days (row second from top), 17 days (row third from top), 30 days (row second from bottom) or 40 days (bottom row) from nanoparticle (NP) fertilizer drop pre-soaked potato slices. The NP fertilizer used was prepared from a reaction mixture including one of five different ligand or ligand mixtures: 0.01 millimoles (mmol) polyethyleneimine (PEI), column on left; 0.07 mmol polyvinylpyrrolidone (PVP)/0.005 mmol PEI, second column from left; 0.06 mmol PVP/0.0083 mmol PEI, third column from left; 0.01 mmol PVP, third column from right; and 0.06 mmol PVP/0.005 mmol PEI, second column from right. The column on the right shows the growth of potato plants grown from slices pre-soaked with a drop of deionized (DI) water as a control.
Figure 18:
FIG. 18 is a photographic image comparing the growth rate of potato plants grown from potato slices pre-soaked with a drop of hematite nanoparticles to that of control potato plants grown from potato slices pre-soaked with a drop of deionized (DI) water. The plants were grown in an open environment.
Figure 19B:
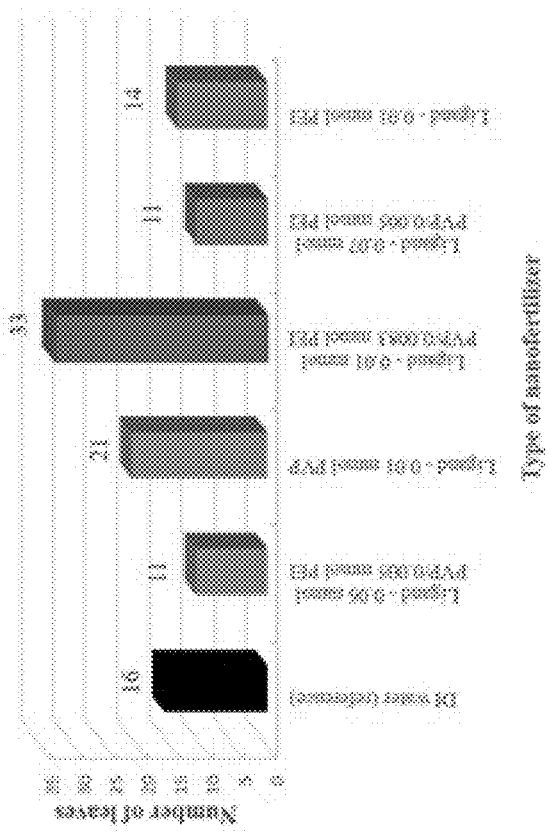
FIG. 19B is a graph showing the leaf count of potato plants grown from potato slices pre-soaked with a drop of different hematite nanoparticle (NP) formulations according to the presently disclosed method. NP formulations were prepared from the following ligands or ligand mixtures: 0.06 millimoles (mmol) polyvinylpyrrolidone (PVP)/0.005 mmol polyethyleneimine (PEI); 0.01 mmol PVP; 0.01 mmol PVP/0.0083 mmol PEI; 0.07 mmol PVP/0.005 mmol PEI; and 0.01 mmol PEI. Data is also shown for control plants from potato slices pre-soaked with a drop of deionized (DI) water.
Figure 19A:
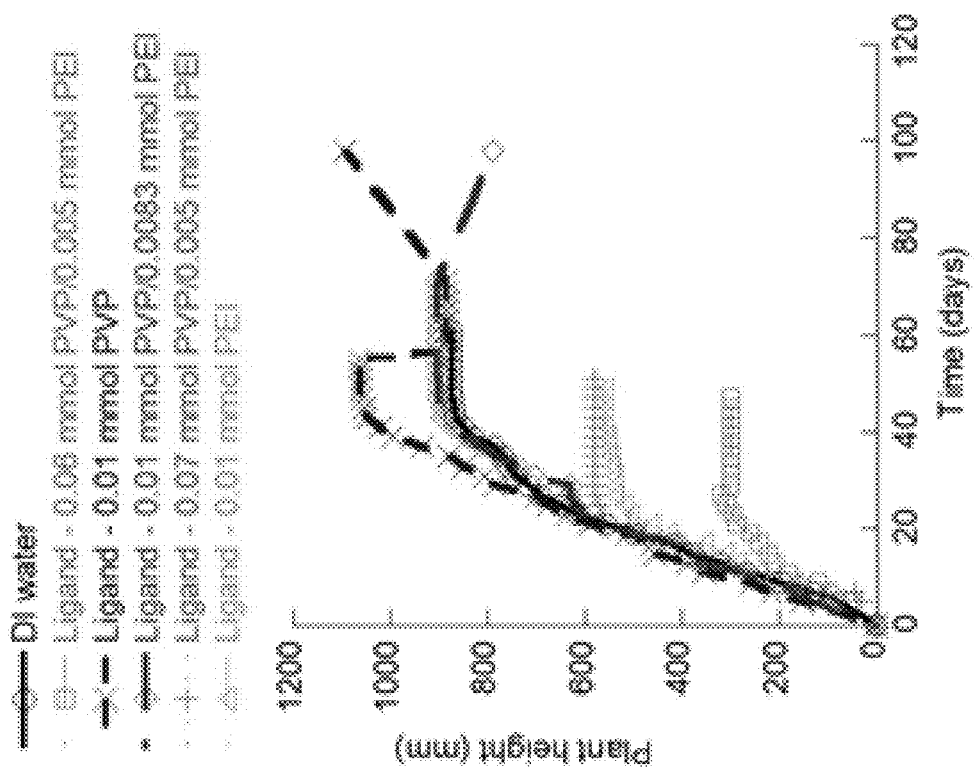
FIG. 19A is a graph showing the time-dependent growth (measured as plant height (in millimeters (mm)) versus time (days)) of potato plants grown from potato slices pre-soaked with a drop of one of several different hematite nanoparticle (NP) formulations according to the presently disclosed subject matter. NP formulations were prepared from reaction mixtures with the following ligand or ligand mixtures: 0.06 millimoles (mmol) polyvinylpyrrolidone (PVP)/0.005 mmol polyethyleneimine (PEI) (squares); 0.01 mmol PVP ("x"s); 0.01 mmol PVP/0.0083 mmol PEI (diamonds); 0.07 mmol PVP/0.005 mmol PEI ("+" s); and 0.01 mmol PEI (triangles). Data is also shown for control plants from potato slices pre-soaked with a drop of deionized (DI) water (circles).

These four NP formulations and the previously described formulation were used as hematite nanoparticle fertilizers for potato plants. One drop of the respective hematite nanofertilizer formulation was added to slices of potatoes placed on moist paper towels inside a petri dish. The control experiment was set up with a drop of DI water and no additional NPs. FIG. 16 shows the potato soaked in a drop of the different hematite NP fertilizers, prior to potting in the soil. The potatoes were planted in potted soil after 4 days and their growth, leaf count, and longevity were monitored regularly for a span of 121 days to assess the effectiveness of NP fertilizers. FIG. 17 shows the images of the control potato plant and the potato plants treated with different hematite nanofertilizer formulations at various stages of growth. This comparative study for growth rate of potato plants was also conducted outside the laboratory under open environmental conditions. FIG. 18 shows the growth rate of potato plants from these studies. The NP fertilizer enhanced plant growth compared to the untreated control plant for both these settings. Two NP formulations significantly boosted the growth and longevity of potato plants. See FIGS. 19A and 19B. Both the 0.01 mmol PVP/0.0083 mmol PEI-coated hematite NPs and 0.01 mmol PVP-coated hematite NPs showed a remarkable 69% increase in life span of potato plants compared to the control plant treated with DI water. The 0.01 mmol PVP-coated NPs facilitated the maximum growth in potato plants with a 25% increase in length compared to the DI water treated plant. The 0.01 mmol PVP/0.0083 mmol PEI-coated hematite NPs also increased the growth of potato plants by 3.5% compared to the control. The study also showed that the 0.01 mmol PVP/0.0083 mmol PEI-coated hematite NPs induced a 2.1 fold increase in leaf production in the potato plant after 17 days while the 0.01 mmol PVP-coated hematite NPs increased leaf production by 1.3 times. See FIG. 19B. These results prove the remarkable impact of the presently disclosed hematite nanofertilizer on growth and resilience of potato plants.

Figure 20:
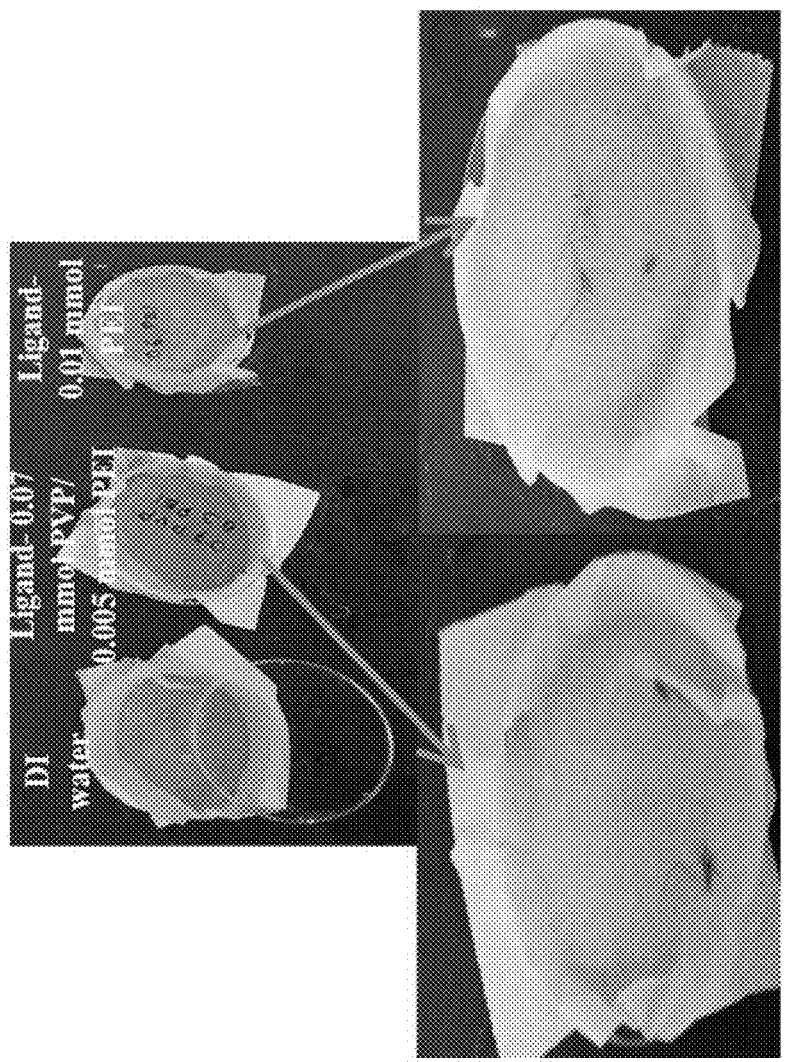
FIG. 20 is a composite photographic image of fescue grass seeds treated with one drop of a hematite nanoparticle (NP) fertilizer formulation via the modified pre-soak method of the presently disclosed subject matter. Grass seeds were treated with a drop of deionized water (top left) or a drop of an NP fertilizer prepared from a ligand mixture of 0.07 millimoles (mmol) polyvinylpyrrolidone (PVP) and 0.005 mmol polyethyleneimine (PEI)(top middle and bottom left) or of 0.01 mmol PEI (top right, bottom right).
Figure 21:
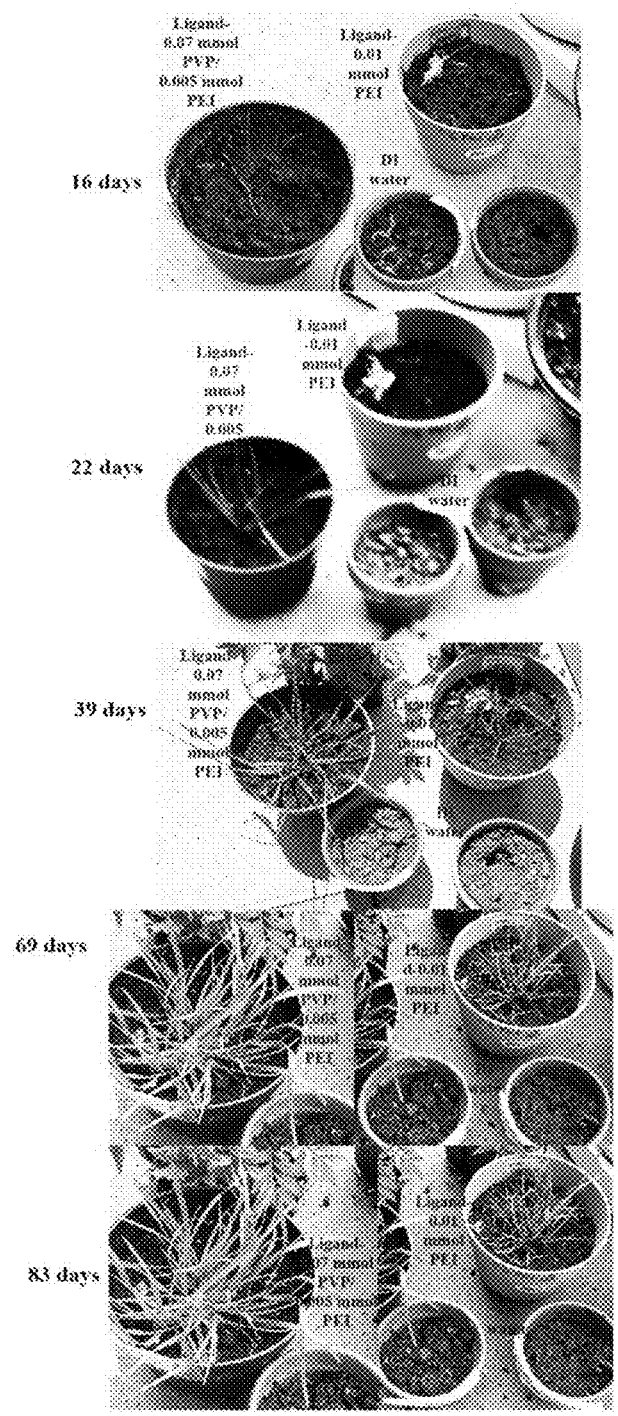
FIG. 21 is a series of images showing the enhanced growth of grass over time (16 days to 83 days) using seeds pre-soaked with a drop of a hematite nanoparticle (NP) formulation prepared using 0.07 millimoles (mmol) polyvinylpyrrolidone (PVP) and 0.005 mmol polyethyleneimine (PEI) or using 0.01 mmol PEI. Also shown for comparison are grass plants grown from seeds pre-soaked with a drop of deionized (DI) water.

These different NP fertilizers were also tested on the growth of grass seeds. The grass seeds were placed on a moist paper towel in a petri dish and treated with one drop of the NPs. The control seeds were treated with DI water to compare the effect of nanofertilizers. The 0.07 mmol PVP/0.005 mmol PEI-coated hematite NPs induced the highest growth in roots, followed by the 0.01 mmol PEI-coated NP fertilizers. See FIG. 20. The germinated grass seeds were potted in soil and monitored for growth and longevity in an outdoor setting. The two hematite nanofertilizer formulations showed remarkable effect on the growth of grass, based on a 100-day study that is currently ongoing. FIG. 21 shows photos of the time-dependent growth of grass plants treated with NP fertilizers. Plants treated with 0.07 mmol PVP/0.005 mmol PEI-coated hematite NPs showed the densest growth, followed by the 0.01 mmol PEI-coated hematite NP-treated plants, while the untreated control grass did not show any growth under the same conditions. Height of the grass treated with 0.07 mmol PVP/0.005 mmol PEI-coated hematite NP fertilizer was 16 cm after 83 days while the grass treated with 0.01 mmol PEI-coated hematite NPs showed the longest growth (22 cm).

Example 6

Corn and Soybean Studies

The effectiveness of the presently disclosed hematite nanoparticle fertilizers was also studied on two major food crops grown in North America, corn and soybean. Time-dependent plant growth experiments were performed using the modified seed pre-soak strategy as described above for the previous plant types (e.g., legumes and grass). A 147% increase in growth rate was observed for corn with 0.01 mmol PVP-coated hematite nanofertilizers. See FIGS. 22A-

Figure 23C:
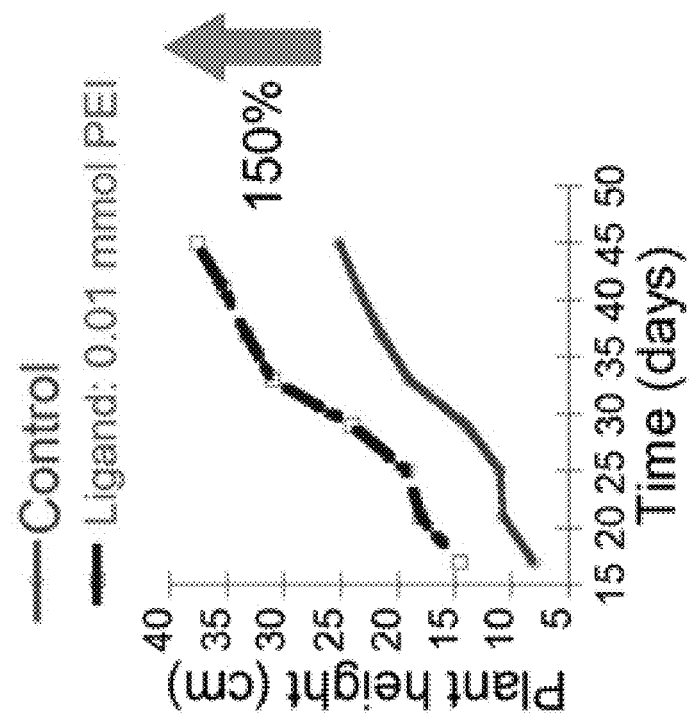
FIG. 23C is a graph showing the time-dependent growth (plant height in centimeters (cm) versus time in days) of a control soybean plant as described for FIG. 23A (solid line, circles) and a soybean plant grown from a hematite nanoparticle (NP) pre-soaked seed as described for FIG. 23B (dashed line, squares).
Figure 23A:
FIG. 23A is a photographic image of a control soybean plant grown from a seed pre-soaked with a drop of deionized (DI) water.
Figure 23B:
FIG. 23B is a photographic image of a soybean plant grown from a seed pre-soaked with a drop of a hematite nanoparticle fertilizer prepared using 0.01 millimole (mmol) polyethyleneimine (PEI).

22C. This formulation gave the best results for corn. The 0.01 mmol PEI-coated hematite nanoparticles were most effective for soybean seeds. These nanoparticles boosted growth rate to soybean by 150% compared to the control plants. See FIGS. 23A-23C. These results show that the presently disclosed nanofertilizer formulation and modified pre-soak method is highly useful for soybean and corn crops as well.

Example 7

Hematite Nanoparticles in Combination with NPK Fertilizer

Figure 24:
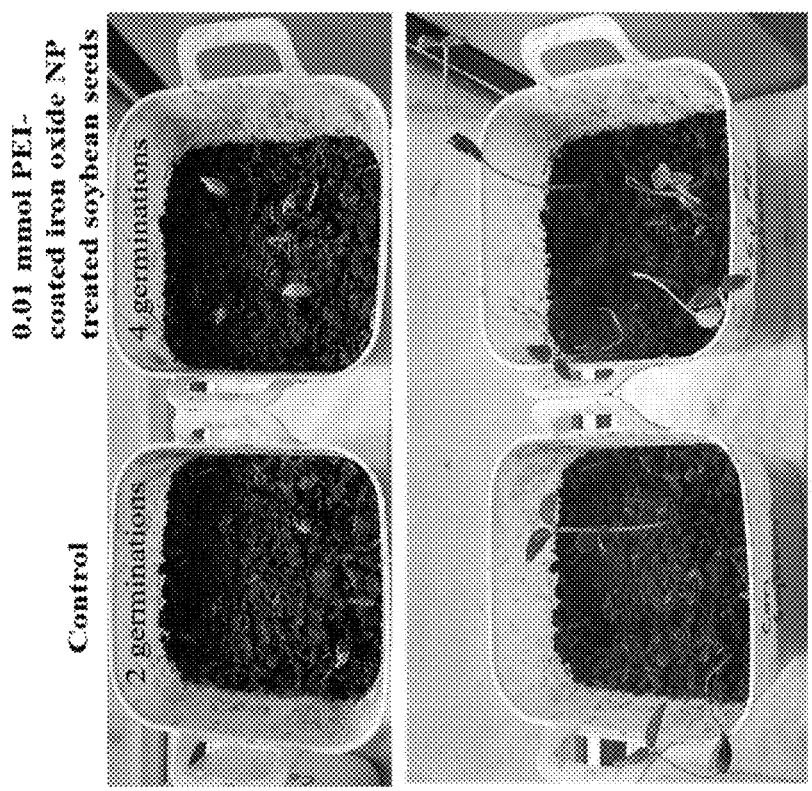
FIG. 24 is a pair of photographs of soybean plants showing increased growth and germination rates for hematite nanoparticle (from a formulation with 0.01 millimoles (mmol) polyethyleneimine (PEI)) pre-treated seeds as compared to control seed in soil prepared with a traditional (nitrogen, phosphorous, potassium (NPK)) fertilizer.

Currently, agricultural lands are typically treated with excess quantities of traditional nitrogen, phosphorus, potassium (NPK) fertilizers to enhance the nutrient content of the soil. Therefore, the effectiveness of the presently disclosed hematite nanoparticle fertilizer formulations and modified seed pre-soaking strategy was used in combination with growing plants in soils treated with traditional NPK fertilizers to mimic typical conditions. Soybean seeds were used for this set of experiments. Five soybean seeds were treated with a drop (0.05 mL) of 0.01 mmol PEI-coated iron oxide nanoparticles and the five control seeds were treated with drops of DI water. Commercial NPK fertilizer was added to the potted soil to prepare the soil for planting. The nanoparticle fertilizer-treated seeds and the control seeds were then planted in two separate pots containing the fertilizer treated soil. The growth of soybean plants was monitored to determine the effectiveness of the nanofertilizer on fertilized soil. The nanoparticle-treated seeds germinated within 4 days after planting, whereas the control soybean seeds showed slower germination with sprouts on day 6. In addition, the germination rate of nanoparticle-treated seeds was two-fold higher than the control seeds. Finally, healthy soybean plants and increased growth rate were observed for the nanoparticle-treated seeds even in the fertilizer-treated soil. See FIG. 24. These results show the compatibility of the hematite nanoparticle fertilizer and modified pre-soak method in fertilizer-treated agricultural soils.

REFERENCES

All references listed in the instant disclosure, including but not limited to all patents, patent applications and publications thereof, scientific journal articles, and database entries are incorporated herein by reference in their entireties to the extent that they supplement, explain, provide a background for, and/or teach methodology, techniques, and/or compositions employed herein. The discussion of the references is intended merely to summarize the assertions made by their authors. No admission is made that any reference (or a portion of any reference) is relevant prior art. Applicants reserve the right to challenge the accuracy and pertinence of any cited reference.

1. H. Roschzttardtz, G. Conejero, F. Divol, C. Alcon, J. L. Verdeil, C. Curie, and S. Mari, "New insights into Fe localization in plant tissues," *Frontiers in Plant Science*, vol 4, pp. 350, 2013.
2. J. Morrissey and M. L. Guerinot, "Iron uptake and transport in plants: the good, the bad, and the ionome," *Chemical Reviews*, vol. 109, pp. 4553, 2009.
3. C. A. Price and E. F. Carell, Control by iron of chlorophyll formation and growth in *Euglena gracilis*. Plant Physiology, vol. 39, pp. 862, 1964.
4. R. Raliya, V. Saharan, C. Dimkpa, and P. Biswas, "Nanofertilizer for precision and sustainable agriculture: current state and future perspectives," *Journal of Agricultural and Food Chemistry*, vol. 66, pp. 6487, 2017.
5. N. Kottegoda, C. Sandaruwan, G. Priyadarshana, A. Siriwardhana, U. A. Rathnayake, D. M. B. Arachchige, A. R. Kumarasinghe, D. Dahanayake, V. Karunaratne, and G. A. J. Amaratunga, "Urea-hydroxyapatite nanohybrids for slow release of nitrogen," *ACS Nano*, vol. 11, pp. 1214, 2017.
6. P. K. Rai, V. Kumar, S. Lee, N. Raza, K. H. Kim, Y. S. Ok, and D. C. W. Tsang, "Nanoparticle-plant interaction: Implications in energy, environment, and agriculture," *Environment International*, vol. 119, pp. 1, 2018.
7. M. M. Rui, C. X. Ma, Y. Hao, J. Guo, Y. K. Rui, X. L. Tang, Q. Zhao, X. Fan, Z. Zhang, T. Hou, and S. Zhu, "Iron oxide nanoparticles as a potential iron fertilizer for peanut (*Arachis hypogaea*)," Frontiers in Plant Science, vol. 7, pp. 815, 2016.
8. A. Karny, A. Zinger, A. Kajal, J. Shainsky-Roitman, and A. Schroeder, "Therapeutic nanoparticles penetrate leaves and deliver nutrients to agricultural crops," *Scientific Reports*, vol. 8, pp. 7589, 2018.
9. D. Kim, A. Kadam, S. Shinde, R. G. Saratale, J. Patra, and G. Ghodake, "Recent developments in nanotechnology transforming the agricultural sector: a transition replete with opportunities," *Journal of the Science of Food and Agriculture*, vol. 98, pp. 849, 2018.
10. J. Yuan, Y. Chen, H. Li, J. Lu, H. Zhao, M. Liu, G. S. Nechitaylo, and N. Glushchenko, "New insights into the cellular responses to iron nanoparticles in *Capsicum annuum*," *Scientific Reports*, vol. 8, pp. 3228, 2018.
11. D. Raju, U. Mehta, and S. Beedu, "Biogenic green synthesis of monodispersed gum kondagogu (*Cochlospermum gossypium*) iron nanocomposite material and its application in germination and growth of mung bean (*Vigna radiata*) as a plant model," *IET Nanobiotechnology*, vol. 10, pp. 141, 2016.
12. G. Srivastava, C. K. Das, A. Das, S. K. Singh, M. Roy, H. Kim, N. Sethy, A. Kumar, R. Sharma, D. Philip, and M. Das, "Seed treatment with iron pyrite ($FeS_2$) nanoparticles increases the production of spinach," *RSC Advances*, vol. 4, pp. 58495, 2014.
13. H. Jangir, C. K. Das, J. Kumar, S. S. Mahapatra, G. Srivastava, A. Bhardwaj, and M. Das, "Nano pyrite ($FeS_2$) root priming enhances chilli and marigold production in nutrients-deficient soil: a nano strategy for fertiliser tuning," *Applied Nanoscience*, vol. 9, pp. 327, 2019.
14. C. K. Das, H. Jangir, J. Kumar, S. Verma, S. S. Mahapatra, D. Philip, G. Srivastava, and M. Das, "Nano pyrite seed dressing: A sustainable design for NPK-equivalent rice production," *Nanotechnology for Environmental Engineering*, vol. 3, pp. 14, 2018.
15. X. Li, Y. Yang, B. Gao, and M. Zhang, "Stimulation of peanut seedling development and growth by zero-valent iron nanoparticles at low concentrations," *Plos One*, vol. 10, pp. e0122884, 2015.
16. K. Jeyasubramanian, U. Thoppey, G. Hikku, N. Selvakumar, A. Subramania, and K. Krishnamoorthy, "Enhancement in growth rate and productivity of spinach grown in hydroponics with iron oxide nanoparticles," *RSC Advances*, vol. 6, pp. 15451, 2016.
17. H. Ren, L. Liu, C. Liu, S. He, J. Huang, J. Li, Y. Zhang, X. Huang, and N. Gu, "Physiological Investigation of Magnetic Iron Oxide Nanoparticles Towards Chinese Mung Bean," *Journal of Biomedical Nanotechnology*, vol. 7, pp. 677, 2011.

18. M. Ghafariyan, M. Malakouti, M. Dadpour, P. Stroeve, and M. Mahmoudi, "Effects of magnetite nanoparticles on soybean chlorophyll," *Environmental Science & Technology*, vol. 47, pp. 10645, 2013.
19. H. Zhu, J. Han, J. Xiao, and Y. Jin, "Uptake, translocation, and accumulation of manufactured iron oxide nanoparticles by pumpkin plants," *Journal of Environmental Monitoring*, vol. 10, pp. 713, 2008.
20. M. Rui, C. Ma, J. C. White, Y. Hao, Y. Wang, X. Tang, J. Yang, F. Jiang, A. Ali, Y. Rui, W. Cao, G. Chen, and B. Xing, "Metal oxide nanoparticles alter peanut (*Arachis hypogaea* L.) physiological response and reduce nutritional quality: a life cycle study," *Environmental Science-Nano*, vol. 5, pp. 2088, 2018.
21. S. Palchoudhury, K. Jungjohann, L. Weerasena, A. Arabshahi, U. Gharge, A. Albattah, J. Miller, K. Patel, and R. Holler, "Enhanced legume root growth with presoaking in $\alpha$-$Fe_2O_3$ nanoparticle fertilizer," *RSC Advances*, vol. 8, pp. 24075, 2018.
22. L. Grillet, S. Mari, and W. Schmidt, "Iron in seeds—loading pathways and subcellular localization," *Frontiers in Plant Science*, vol. 4, pp. 535, 2014.
23. J. Stegemeier, B. Colman, F. Schwab, M. Wiesner, G. Lowry, "Uptake and distribution of silver in the aquatic plant *Landoltia punctata* (Duckweed) exposed to silver and silver sulfide nanoparticles," *Environmental Science & Technology*, vol. 51, pp. 4936, 2017.
24. X. Gui, Y. Deng, Y. Rui, B. Gao, W. Luo, S. Chen, L. Nhan, X. Li, S. Liu, Y. Han, L. Liu, and B. Xing, "Response difference of transgenic and conventional rice (*Oryza sativa*) to nanoparticles (gamma $Fe_2O_3$)," *Environmental Science and Pollution Research*, vol. 22, pp. 17716, 2015.
25. J. Lv, P. Christie, and S. Zhang, "Uptake, translocation, and transformation of metal-based nanoparticles in plants: recent advances and methodological challenges," *Environmental Science: Nano*, vol. 6, pp. 41, 2019.
26. A. Milewska-Hendel, M. Zubko, J. Karcz, D. Stroz, and E. Kurczynska, "Fate of neutral-charged gold nanoparticles in the roots of the *Hordeum vulgare* L. cultivar Karat," *Scientific Reports*, vol. 7, pp. 3014, 2017.
27. L. Van Nhan, C. Ma, Y. Rui, W. Cao, Y. Deng, L. Liu, and B. Xing, "The effects of $Fe_2O_3$ nanoparticles on physiology and insecticide activity in non-transgenic and Bt-transgenic cotton," *Frontiers in Plant Science*, vol. 6, pp. 1263, 2016.
28. M. Mortimer, A. Gogos, N. Bartolome, A. Kahru, T. Bucheli, and V. Slaveykova, "Potential of hyperspectral imaging microscopy for semi-quantitative analysis of nanoparticle uptake by protozoa," *Environmental Science & Technology*, vol. 48, pp. 8760, 2014.
29. A. Avellan, F. Schwab, A. Masion, P. Chaurand, D. Borschneck, V. Vidal, J. Rose, C. Santaella, and C. Levard, "Nanoparticle uptake in plants: gold nanomaterial localized in roots of *Arabidopsis thaliana* by X-ray computed nanotomography and hyperspectral imaging," *Environmental Science & Technology*, vol. 51, pp. 8682, 2017.
30. R. Sekine, K. Moore, M. Matzke, P. Vallotton, H. Jiang, G. Hughes, J. Kirby, E. Donner, C. Grovenor, C. Svendsen, and E. Lombi, "Complementary imaging of silver nanoparticle interactions with green algae: dark-field microscopy, electron microscopy, and nanoscale secondary ion mass spectrometry," *ACS Nano*, vol. 11, pp. 10894, 2017.
31. S. Palchoudhury and J. R. Lead, "A facile and cost-effective method for separation of oil-water mixtures using polymer-coated iron oxide nanoparticles," *Environmental Science & Technology*, vol. 48, pp. 14558, 2014.
32. A. Pequerul, C. Perez, P. Madero, J. Val, and E. Monge, A rapid wet digestion method for plant analysis. In *Optimization of Plant Nutrition*, Springer: 1993; pp 3-6.
33. F. Yunta, M. Di Foggia, V. Bellido-Diaz, M. Morales-Calderon, P. Tessarin, S. Lopez-Rayo, A. Tinti, K. Kovacs, Z. Klencsar, F. Fodor, and A. Rombola, "Blood meal-based compound. good choice as iron fertilizerfor organic farming," *Journal of Agricultural and Food Chemistry*, vol. 61, pp. 3995, 2013.
34. M. D. Frost, J. C. Cole, and J. M. Dole, "Fertilizer source affects iron, manganese, and zinc leaching, nutrient distribution, and geranium growth," *Journal of Plant Nutrition*, vol. 26, pp. 315, 2003.
35. G. Achari and M. Kowshik, "Recent developments on nanotechnology in agriculture: plant mineral nutrition, health, and interactions with soil microflora," *Journal of Agricultural and Food Chemistry*, vol. 66, pp. 8647, 2018.
36. R. Pundir, M. Mengesha, and K. Reddy, "Leaf types and their genetics in chickpea (*Cicer-Arietinum* L)," *Euphytica*, vol. 45, pp. 197, 1990.
37. J. Iqbal, M. Ahsan, M. Saleem, and A. Asghar, "Appraisal of gene action for indeterminate growth in mungbean *Vigna radiata* (L.) wilczek," *Frontiers in Plant Science*, vol. 6, pp. 665, 2015.
38. N. Petry, E. Boy, J. P. Wirth, and R. F. Hurrell, Review: The potential of the common bean (*Phaseolus vulgaris*) as a vehicle for iron biofortification. *Nutrients*, vol. 7, pp. 1144, 2015.
39. C. Miles, K. Atterberry, and B. Brouwer, "Performance of northwest washington heirloom dry bean varieties in organic production," *Agronomy-Basel*, vol. 5, pp. 491, 2015.
40. A. Moghimi, C. Yang, M. E. Miller, S. F. Kianian, and P. M. Marchetto, "A novel approach to assess salt stress tolerance in wheat using hyperspectral imaging," *Frontiers in Plant Science*, vol. 9, pp. 1182, 2018.
41. A. Ertani, O. Francioso, E. Ferrari, M. Schiavon, and S. Nardi, "Spectroscopic-chemical fingerprint and biostimulant activity of a protein-based product in solid form," *Molecules*, vol. 23, pp. 1031, 2018.
42. M. Mohammadi, N. M. Hoseini, M. R. Chaichi, H. Alipour, M. Dashtaki, and S. Safikhani, Influence of nano-iron oxide and zinc sulfate on physiological characteristics of peppermint. *Communications in Soil Science and Plant Analysis*, vol. 49, pp. 2315, 2018.
43. G. Srivastava, A. Das, T. S. Kusurkar, M. Roy, S. Airan, R. K. Sharma, S. K. Singh, S. Sarkar, and M. Das, Iron pyrite, a potential photovoltaic material, increases plant biomass upon seed pretreatment. *Materials Express*, vol. 4, pp. 23, 2014.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of enhancing corn plant growth, the method comprising contacting a corn seed with a single drop of an aqueous composition comprising an iron oxide nanoparticle for a period of time prior to planting said corn seed, wherein the single drop is of a volume of 0.03 milliliters (mL) to about 0.07 mL, and wherein the iron oxide nanoparticle comprises a core comprising iron oxide and one or more polymeric organic ligands bound to iron (Fe) ions at the surface of the core, providing a surface coating of the one or more polymeric organic ligands, wherein said one or more polymeric organic ligands comprise one or more hydrophilic polymers, and wherein the drop has an iron oxide nanoparticle concentration of between about 0.01 grams per liter (gL$^{-1}$) and about 1.5 gL$^{-1}$, wherein the one or more polymeric organic ligands are selected from polyvinylpyrrolidone (PVP) and polyethyleneimine (PEI), and wherein the iron oxide nanoparticle is prepared from a reaction mixture comprising an iron precursor and one or both of PVP and PE, and wherein said reaction mixture comprises about 0 moles to about 0.04 moles of PVP per mole of iron precursor and about 0 moles to about 0.01 moles of PE per mole of iron precursor.

2. The method of claim 1, wherein the period of time is sufficient for the corn seed to germinate.

3. The method of claim 2, wherein the period of time is about 2 days to about 5 days.

4. The method of claim 1, wherein the corn seed is placed on a wetted cellulosic substrate prior to or during said period of time.

5. The method of claim 1, wherein the corn seed is a seed of a corn plant species planted for food or for bio-energy production.

6. The method of claim 1, wherein the drop comprises about 10 micrograms (µg) to about 75 µg of Fe.

7. The method of claim 1, wherein the iron oxide comprises hematite.

8. The method of claim 1, wherein the iron oxide nanoparticle has an average hydrodynamic diameter of about 50 nanometers (nm) to about 250 nm as measured by dynamic light scattering.

9. The method of claim 1, wherein the iron oxide nanoparticle has a surface charge of about −10 mV to about 40 mV.

10. The method of claim 9, wherein the iron oxide nanoparticle has a surface charge of about 1.0 mV to about 35 mV.

11. The method of claim 1, wherein the iron precursor is iron (III) acetylacetonate (Fe(acac)$_3$).

12. The method of claim 1, wherein the reaction mixture comprises about 0 moles to about 0.030 moles of PVP per mole of iron precursor and about 0 moles to about 0.010 moles of PEI per mole of iron precursor.

13. The method of claim 1, wherein the iron oxide nanoparticle is prepared from a reaction mixture selected from the group consisting of a reaction mixture comprising about 0.035 moles of PVP and about 0.0025 moles of PE per mole of iron precursor; a reaction mixture comprising about 0.030 moles of PVP and about 0.0025 moles of PEI per mole of iron precursor; a reaction mixture comprising about 0.005 moles of PVP per mole of iron precursor; a reaction mixture comprising about 0.005 moles of PVP and about 0.00415 moles of PE per mole of iron precursor; and a reaction mixture comprising about 0.005 moles of PE per mole of iron precursor.

14. The method of claim 1, wherein the iron nanoparticle is prepared from a reaction mixture comprising an iron precursor and the one or more polymeric organic ligands, and wherein a ratio P:C of moles of iron precursor to total moles of said one or more polymeric organic ligands is about 20 to about 200.

15. The method of claim 14, wherein the ratio P:C is about 30 to about 200.

16. The method of claim 1, wherein the corn seed is planted in a soil that has been exposed to a traditional fertilizer or wherein plants growing from said corn seed are treated with a traditional fertilizer.

17. The method of claim 1, wherein enhancing corn plant growth comprises one or more of increasing growth rate, increasing plant height, increasing root growth, increasing leaf production, increasing fruit production, increasing the rate of fruit production, increasing seed pod production, increasing plant survival rate, and increasing plant life span compared to a plant from an untreated seed.

18. The method of claim 1, wherein the method provides a corn plant with a growth rate about 147% that of a corn plant grown from an untreated corn seed.

19. The method of claim 1, wherein said one or more hydrophilic polymers comprises polyvinylpyrrolidone (PVP) at 0.01 millimole (mmol).

\* \* \* \* \*